US012384166B2

(12) United States Patent
Okui

(10) Patent No.: US 12,384,166 B2
(45) Date of Patent: Aug. 12, 2025

(54) LIQUID EJECTING APPARATUS AND LIQUID DISCHARGING METHOD

(71) Applicant: SEIKO EPSON CORPORATION, Tokyo (JP)

(72) Inventor: Hiroaki Okui, Azumino (JP)

(73) Assignee: SEIKO EPSON CORPORATION (JP)

(*) Notice: Subject to any disclaimer, the term of this patent is extended or adjusted under 35 U.S.C. 154(b) by 186 days.

(21) Appl. No.: 18/322,666

(22) Filed: May 24, 2023

(65) Prior Publication Data

US 2023/0382125 A1 Nov. 30, 2023

(30) Foreign Application Priority Data

May 25, 2022 (JP) ................................ 2022-085374

(51) Int. Cl.
*B41J 2/175* (2006.01)

(52) U.S. Cl.
CPC ................................ *B41J 2/17596* (2013.01)

(58) Field of Classification Search
CPC ........... B41J 2/17596; B41J 2/175; B41J 2/18
See application file for complete search history.

(56) References Cited

U.S. PATENT DOCUMENTS

| | | | | |
|---|---|---|---|---|
| 10,906,306 | B2 * | 2/2021 | Tamai | B41J 2/14233 |
| 11,040,534 | B2 * | 6/2021 | Miyagishi | B41J 2/14233 |
| 11,135,853 | B1 * | 10/2021 | Yu | B41J 2/18 |
| 11,840,085 | B2 * | 12/2023 | Watanabe | B41J 2/14233 |
| 2022/0024207 | A1 | 1/2022 | Watanabe | |

FOREIGN PATENT DOCUMENTS

| | | |
|---|---|---|
| JP | 2021-130258 A | 9/2021 |
| JP | 2022-023542 A | 2/2022 |
| JP | 2022-030641 A | 2/2022 |

* cited by examiner

*Primary Examiner* — An H Do
(74) *Attorney, Agent, or Firm* — Harness, Dickey & Pierce, P.L.C.

(57) ABSTRACT

A liquid ejecting apparatus includes: nozzles; individual flow paths communicating with each of the nozzles; a liquid storage portion storing liquid; a supply flow path for supplying the liquid from the liquid storage portion to the individual flow paths; a recovery flow path for recovering the liquid from the individual flow paths to the liquid storage portion; a bypass flow path that couples the supply flow path and the recovery flow path; and an on-off valve configured to close and open the recovery flow path, in which the on-off valve is disposed between the bypass flow path and the liquid storage portion in the recovery flow path, and a pressurization discharge operation of discharging the liquid from each of the nozzles by pressurizing the liquid in the supply flow path in a state in which the recovery flow path is closed by the on-off valve is executed.

20 Claims, 16 Drawing Sheets

LIQUID EJECTING APPARATUS AND LIQUID DISCHARGING METHOD

The present application is based on, and claims priority from JP Application Serial Number 2022-085374, filed May 25, 2022, the disclosure of which is hereby incorporated by reference herein in its entirety.

BACKGROUND

1. Technical Field

The present disclosure relates to a liquid ejecting apparatus and a liquid discharging method.

2. Related Art

In the related art, a liquid ejecting apparatus that ejects liquid such as ink is known, as represented by an ink jet type printer. For example, in JP-A-2021-130258, a liquid ejecting apparatus having a plurality of individual flow paths that communicate with each of a plurality of nozzles for ejecting ink, a supply flow path that supplies liquid to each of the plurality of individual flow paths, and a recovery flow path that recovers the liquid from each of the plurality of individual flow paths is disclosed.

However, in the above-mentioned technique in the related art, even though the liquid flows in the order of the supply flow path, the individual flow path, and the recovery flow path, a bubble may stay in the recovery flow path.

SUMMARY

In order to solve the above problems, a liquid ejecting apparatus according to a preferred aspect of the present disclosure includes: a plurality of nozzles that eject liquid; a plurality of individual flow paths that communicate with each of the plurality of nozzles; a liquid storage portion that stores the liquid to be supplied to each of the plurality of nozzles; a supply flow path for supplying the liquid from the liquid storage portion to the plurality of individual flow paths; a recovery flow path for recovering the liquid from the plurality of individual flow paths to the liquid storage portion; a bypass flow path that couples the supply flow path and the recovery flow path without passing through any of the plurality of individual flow paths; and an on-off valve configured to close and open the recovery flow path, in which the on-off valve is disposed between the bypass flow path and the liquid storage portion in the recovery flow path, and a pressurization discharge operation of discharging the liquid from each of the plurality of nozzles by pressurizing the liquid in the supply flow path in a state in which the recovery flow path is closed by the on-off valve is executed.

A liquid discharging method of a liquid ejecting apparatus according to another preferred aspect of the present disclosure, the liquid ejecting apparatus including a plurality of nozzles that eject liquid, a plurality of individual flow paths that communicate with each of the plurality of nozzles, a liquid storage portion that stores the liquid to be supplied to each of the plurality of nozzles, a supply flow path for supplying the liquid from the liquid storage portion to the plurality of individual flow paths, a recovery flow path for recovering the liquid from the plurality of individual flow paths to the liquid storage portion, a bypass flow path that couples the supply flow path and the recovery flow path without passing through any of the plurality of individual flow paths, and an on-off valve configured to close and open the recovery flow path, the method includes: disposing the on-off valve between the bypass flow path and the liquid storage portion in the recovery flow path; and executing a pressurization discharge operation of discharging the liquid from each of the plurality of nozzles by pressurizing the liquid in the supply flow path in a state in which the recovery flow path is closed by the on-off valve, by the liquid ejecting apparatus.

DESCRIPTION OF EXEMPLARY EMBODIMENTS

Hereinafter, embodiments for carrying out the present disclosure will be described with reference to the accompanying drawings. However, in each drawing, the size and scale of each portion are appropriately different from the actual ones. In addition, since the embodiments described below are preferred specific examples of the present disclosure, various technically preferable limitations are attached, but the scope of the present disclosure is not limited to the embodiments unless otherwise stated to specifically limit the present disclosure in the following description.

The following description will be given by appropriately using an X axis, a Y axis, and a Z axis which intersect with each other for convenience. In addition, one direction along the X axis is an X1 direction, and a direction opposite to the X1 direction is an X2 direction. Similarly, directions opposite to each other along the Y axis are a Y1 direction and a Y2 direction. In addition, directions opposite to each other along the Z axis are a Z1 direction and a Z2 direction.

Here, typically, the Z axis is a vertical axis, and the Z2 direction corresponds to a downward direction in the vertical direction. In other words, the Z2 direction is a gravity direction. However, the Z axis may not be a vertical axis and may be inclined with respect to the vertical axis. In addition, although the X axis, the Y axis, and the Z axis are typically orthogonal to each other, the axes are not limited thereto and may intersect at an angle within the range of, for example, 80 degrees or more and 100 degrees or less.

1. FIRST EMBODIMENT

1-1. Outline of Liquid Ejecting Apparatus 100

Figure 1:
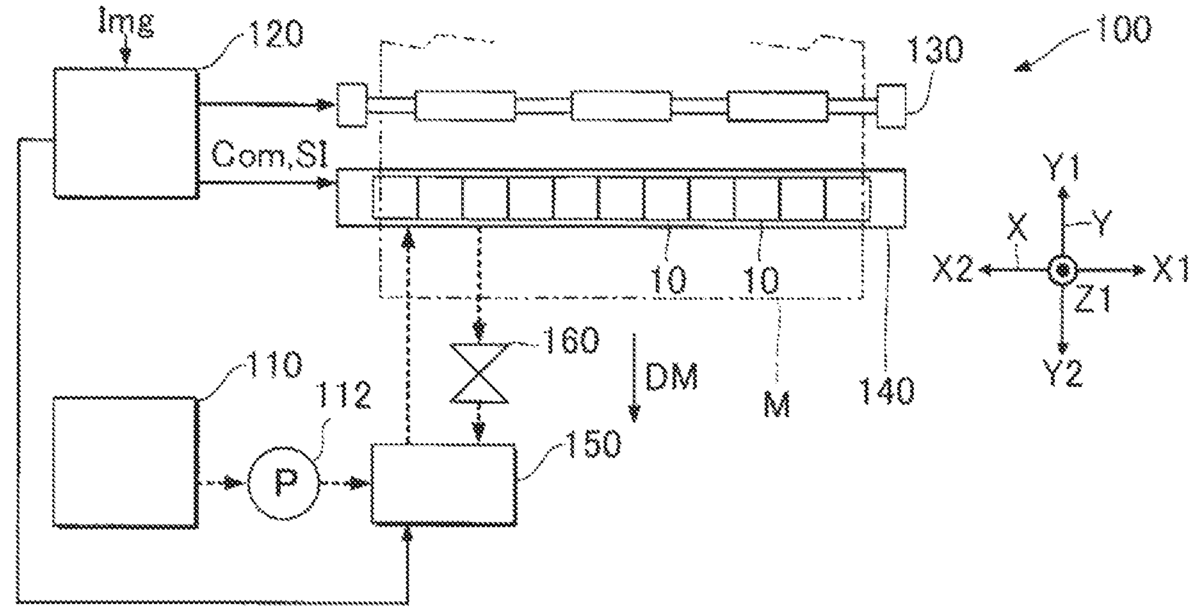
FIG. 1 is a schematic view illustrating a configuration example of a liquid ejecting apparatus according to an embodiment.

FIG. 1 is a schematic view illustrating a configuration example of a liquid ejecting apparatus 100 according to an embodiment. The liquid ejecting apparatus 100 is an ink jet type printing apparatus that ejects ink which is an example of liquid onto a medium M as a droplet. The liquid ejecting apparatus 100 of the present embodiment is a so-called line type printing apparatus in which a plurality of nozzles N for ejecting the ink are distributed over the entire range in a width direction of the medium M. The medium M is typically printing paper. The medium M is not limited to the printing paper, and may be, for example, a printing target made of any material such as a resin film or cloth.

As illustrated in FIG. 1, the liquid ejecting apparatus 100 includes a main tank 110, a pump 112, a control module 120, a transport mechanism 130, a liquid ejecting module 140 having a plurality of liquid ejecting heads 10, a circulation mechanism 150, and an on-off valve 160.

The main tank 110 is a container that stores the ink. Examples of a specific aspect of the main tank 110 include a cartridge attachable to and detachable from the liquid ejecting apparatus 100, a bag-shaped ink pack formed of a flexible film, and an ink tank replenishable with the ink. The type of ink stored in the main tank 110 is optional.

Although not illustrated in the drawing, the main tank 110 of the present embodiment includes a first liquid container and a second liquid container. The first liquid container stores a first ink. The second liquid container stores a second ink having a type different from that of the first ink. For example, the first ink and the second ink have different colors from each other. The first ink and the second ink may be the same type of ink. The pump 112 adjusts the amount of ink supplied from the main tank 110 to the circulation mechanism 150 under the control of the control module 120. An apparatus other than the control module 120 may control the pump 112. The pump 112 is provided for each container of the first liquid container and second liquid container described above.

The control module 120 controls an operation of each element of the liquid ejecting apparatus 100. Specifically, the control module 120 receives image data Img indicating an image from a host computer such as a personal computer or a digital camera. Based on the received image data Img, the control module 120 supplies a drive signal Com for driving the liquid ejecting head 10 and a control signal SI for controlling the liquid ejecting head 10 to the liquid ejecting head 10. Then, the liquid ejecting head 10 is driven by the drive signal Com under the control of the control signal SI, and ejects the ink in the Z2 direction from a part or all of the plurality of nozzles N provided in the liquid ejecting head 10. That is, the liquid ejecting head 10 ejects the ink from a part or all of the plurality of nozzles N in conjunction with the transport of the medium M by the transport mechanism 130, and causes the ejected ink to land on the surface of the medium M, thereby executing printing process for forming a desired image on the surface of the medium M. The nozzle N will be described later with reference to FIGS. 5, 6, and 7.

The control module 120 includes, for example, one or a plurality of processing circuits such as a CPU or an FPGA, and one or a plurality of storage circuits such as a semiconductor memory. The CPU is an abbreviation of a central processing unit. The FPGA is an abbreviation of a field programmable gate array. Various programs and various data are stored in the storage circuit. The processing circuit realizes various controls by executing the programs and using the data as appropriate.

The transport mechanism 130 transports the medium M in a direction DM under control of the control module 120. The direction DM of the present embodiment is the Y2 direction. In an example illustrated in FIG. 1, the transport mechanism 130 includes a long transport roller along the X axis and a motor that rotates the transport roller. The transport mechanism 130 is not limited to the configuration using the transport roller, and may be configured to use, for example, a drum or an endless belt that transports the medium M in a state in which the medium M is attracted to an outer peripheral surface by electrostatic force or the like.

Under the control of the control module 120, the liquid ejecting module 140 ejects the ink supplied from the main tank 110 via the pump 112 and the circulation mechanism 150 onto the medium M in the Z2 direction from each of the plurality of nozzles N. The liquid ejecting module 140 is a line head having a plurality of the liquid ejecting heads 10 disposed such that the plurality of nozzles N are distributed throughout the entire range of the medium M in a direction of the X axis. That is, the group of the plurality of liquid ejecting heads 10 constitutes a long line head extending in a direction along the X axis. By ejecting the ink from the plurality of liquid ejecting heads 10 in parallel with the transport of the medium M by the transport mechanism 130, an image is formed on a surface of the medium M by the ink. The plurality of nozzles N included in one liquid ejecting head 10 may be disposed so as to be distributed throughout the entire range of the medium M in the direction along the X axis. In such a case, for example, the liquid ejecting module 140 is constituted of the one liquid ejecting head 10.

The main tank 110 is coupled to the liquid ejecting module 140 via the circulation mechanism 150. The circulation mechanism 150 is a mechanism that supplies the ink to each of the plurality of liquid ejecting heads 10 in the liquid ejecting module 140 under the control of the control module 120, and that recovers the ink discharged from each of the plurality of liquid ejecting heads 10 in order to resupply the ink to the liquid ejecting head 10. The circulation mechanism 150 and the on-off valve 160 are provided for each container of the first liquid container and second liquid container described above. By the operation of the circulation mechanism 150, it is possible to suppress an increase in the viscosity of the ink and reduce the retention of the bubble in the ink. The circulation mechanism 150 and the on-off valve 160 will be described with reference to FIG. 2.

1-2. Circulation Mechanism 150 and On-Off Valve 160

Figure 2:
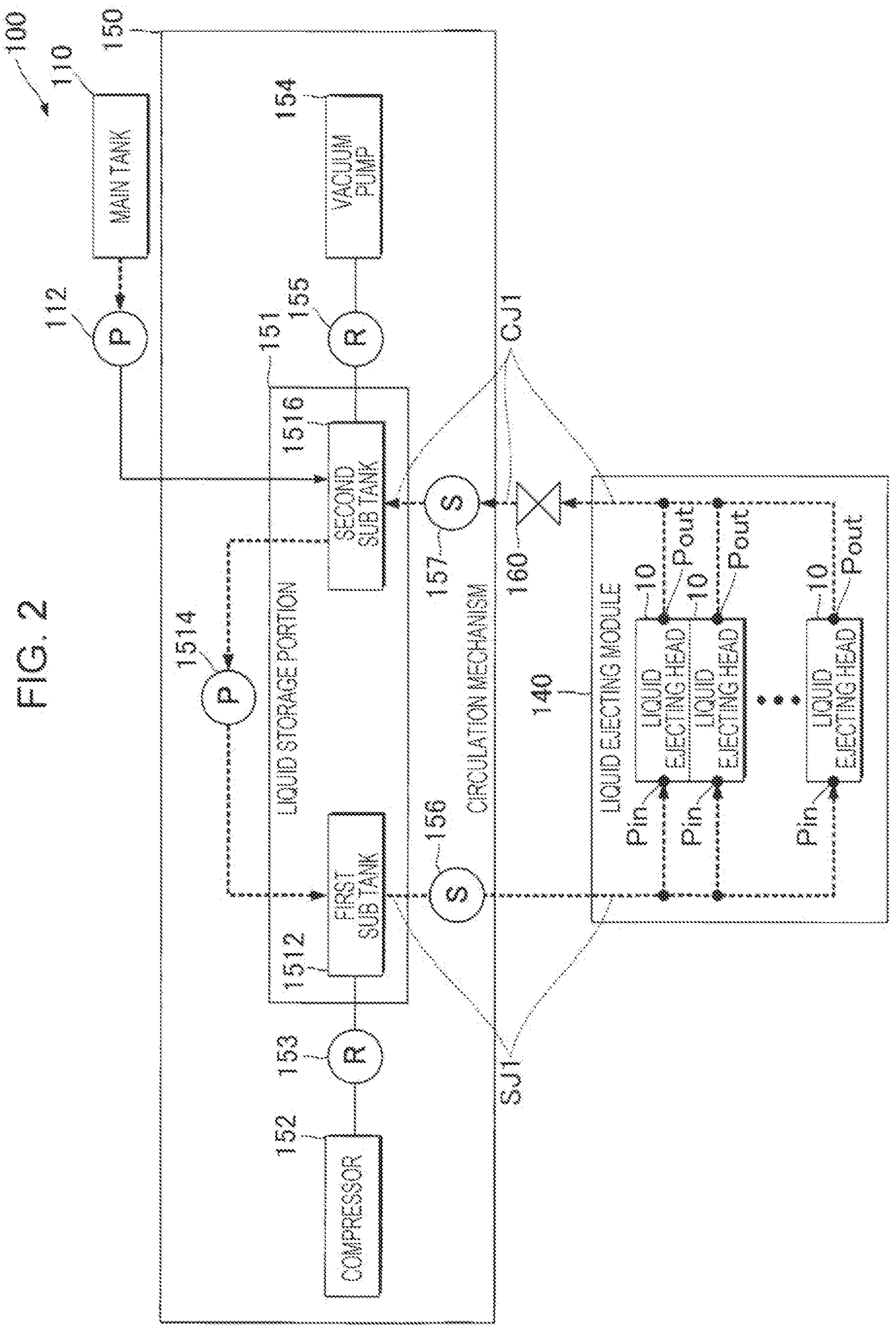
FIG. 2 is a view illustrating a circulation mechanism and an on-off valve.

FIG. 2 is a view illustrating the circulation mechanism 150 and the on-off valve 160. Elements related to the first ink are displayed in FIG. 2. Since the elements related to the second ink are the same as the elements related to the first ink, illustration and description thereof will be omitted.

As illustrated in FIG. 2, the circulation mechanism 150 includes a liquid storage portion 151, a compressor 152, a regulator 153, a vacuum pump 154, a regulator 155, a pressure sensor 156, a pressure sensor 157, and a pump 1514.

The liquid storage portion 151 is coupled to a supply flow path SF1 and a recovery flow path CF1, which will be described in detail later, and stores the first ink to be supplied to each of the plurality of liquid ejecting heads 10. The liquid storage portion 151 of the present embodiment has a first sub tank 1512 coupled to the supply flow path SF1 and a second sub tank 1516 coupled to the recovery flow path CF1. In the first sub tank 1512, the first ink to be supplied to each of the plurality of liquid ejecting heads 10 is stored. In the second sub tank 1516, the first ink recovered from each of the plurality of liquid ejecting heads 10 and the first ink replenished from the main tank 110 are stored.

The supply flow path SF1 has an in-apparatus supply flow path SJ1 that is coupled to the first sub tank 1512 and distributes and supplies the first ink to the plurality of liquid ejecting heads 10, and a plurality of in-head supply flow paths which will be described in detail later. The in-apparatus supply flow path SJ1 is a flow path provided outside the liquid ejecting head 10, and includes a main flow portion coupled to the first sub tank 1512 and a plurality of tributary portions branched from the main flow portion for each of the plurality of in-head supply flow paths.

The recovery flow path CF1 has an in-apparatus recovery flow path CJ1 that is coupled to the second sub tank 1516 and recovering the first ink by merging the first ink from the plurality of liquid ejecting heads 10, and a plurality of in-head recovery flow paths which will be described in detail later. The in-apparatus recovery flow path CJ1 is a flow path provided outside the liquid ejecting head 10, and includes a main flow portion coupled to the second sub tank 1516 and a plurality of tributary portions for coupling the main flow portion and each of the plurality of in-head recovery flow paths.

The on-off valve 160 is provided in the middle of the in-apparatus recovery flow path CJ1. The on-off valve 160 can close and open the in-apparatus recovery flow path CJ1 under the control of the control module 120. In the following description, closing the in-apparatus recovery flow path CJ1 by the on-off valve 160 may be described as "closing the on-off valve 160", and opening the in-apparatus recovery flow path CJ1 by the on-off valve 160 may be described as "opening the on-off valve 160". An apparatus other than the control module 120 may control the on-off valve 160. The on-off valve 160 may be any valve as long as it can be controlled by an apparatus such as the control module 120, and is, for example, a diaphragm valve, an electromagnetic valve, an electric valve, or the like.

In the present embodiment, the on-off valve 160 is provided in the middle of the main flow portion of the in-apparatus recovery flow path CJ1, but a plurality of the on-off valves 160 may be provided in the middle of each of the plurality of tributary portions of the in-apparatus recovery flow path CJ1.

The compressor 152 and the vacuum pump 154 generate differential pressure between the pressure in the first sub tank 1512 and the pressure in the second sub tank 1516. In the present embodiment, the compressor 152 generates only pressure higher than pressure generated by the vacuum pump 154. Specifically, the compressor 152 generates positive pressure higher than atmospheric pressure. The vacuum pump 154 generates negative pressure lower than the atmospheric pressure. The compressor 152 is an example of a "pressurizing mechanism". However, the pressurizing mechanism is not limited to the compressor, and may be a pump such as a tube pump, a syringe pump, or a diaphragm pump.

The regulator 153 is provided between the compressor 152 and the first sub tank 1512. The regulator 153 adjusts the pressure generated in the compressor 152 to predetermined positive pressure under the control of the control module 120, and supplies the predetermined positive pressure to the first sub tank 1512. A value of the predetermined positive pressure is a value determined by a manufacturer of the liquid ejecting apparatus 100 or the like.

The regulator 155 is provided between the vacuum pump 154 and the second sub tank 1516. The regulator 155 adjusts the pressure generated in the vacuum pump 154 to predetermined negative pressure under the control of the control module 120, and supplies the predetermined negative pressure to the second sub tank 1516. A value of the predetermined negative pressure is a value determined by the manufacturer of the liquid ejecting apparatus 100 or the like.

The pump 1514 is provided between the first sub tank 1512 and the second sub tank 1516. The pump 1514 causes the first ink of the second sub tank 1516 to flow to the first sub tank 1512 under the control of the control module 120.

The pressure sensor 156 is provided in the middle of the in-apparatus supply flow path SJ1 between the first sub tank 1512 and the liquid supply port Pin of the liquid ejecting head 10. The pressure sensor 156 measures the pressure of the in-apparatus supply flow path SJ1, and transmits the measurement information indicating the measured value which is the measurement result to the control module 120.

The pressure sensor 157 is provided in the middle of the in-apparatus recovery flow path CJ1 between the second sub tank 1516 and the liquid discharge port Pout of the liquid ejecting head 10. More specifically, the pressure sensor 157 is provided between the on-off valve 160 and the second sub tank 1516. The pressure sensor 157 measures the pressure of the in-apparatus recovery flow path CJ1, and transmits the measurement information indicating the measured value which is the measurement result to the control module 120.

As described above, the first ink flows into the liquid ejecting head 10 from the first sub tank 1512 via the liquid supply port Pin, the first ink is recovered from the liquid discharge port Pout to the second sub tank 1516, and the first ink flows into the first sub tank 1512 from the second sub tank 1516 by the pump 1514 to circulate the first ink.

The control module 120 controls the regulator 153 so that the measured value indicated by the measurement information received from the pressure sensor 156 approaches the predetermined positive pressure. Similarly, the control module 120 controls the regulator 155 so that the measured value indicated by the measurement information received from the pressure sensor 157 approaches the predetermined negative pressure.

By the control of the control module 120 described above, the control module 120 can keep the pressure of the meniscus, which is a liquid level of the nozzle N, constant while circulating the first ink via the inside of the liquid ejecting head 10. An apparatus other than the control module 120 may control the circulation mechanism 150.

When the first ink is ejected from the nozzle N, the sum of the first ink amount in the first sub tank 1512 and the second sub tank 1516 is reduced. Therefore, the pump 112 appropriately replenishes the first ink in the second sub tank 1516 by supplying the ink from the main tank 110 to the second sub tank 1516 under the control of the control module 120. For example, the first ink in the second sub tank 1516 is replenished at the timing when the height of the first ink in the second sub tank 1516 is lower than a predetermined height.

1-3. Liquid Ejecting Module 140

Figure 3:
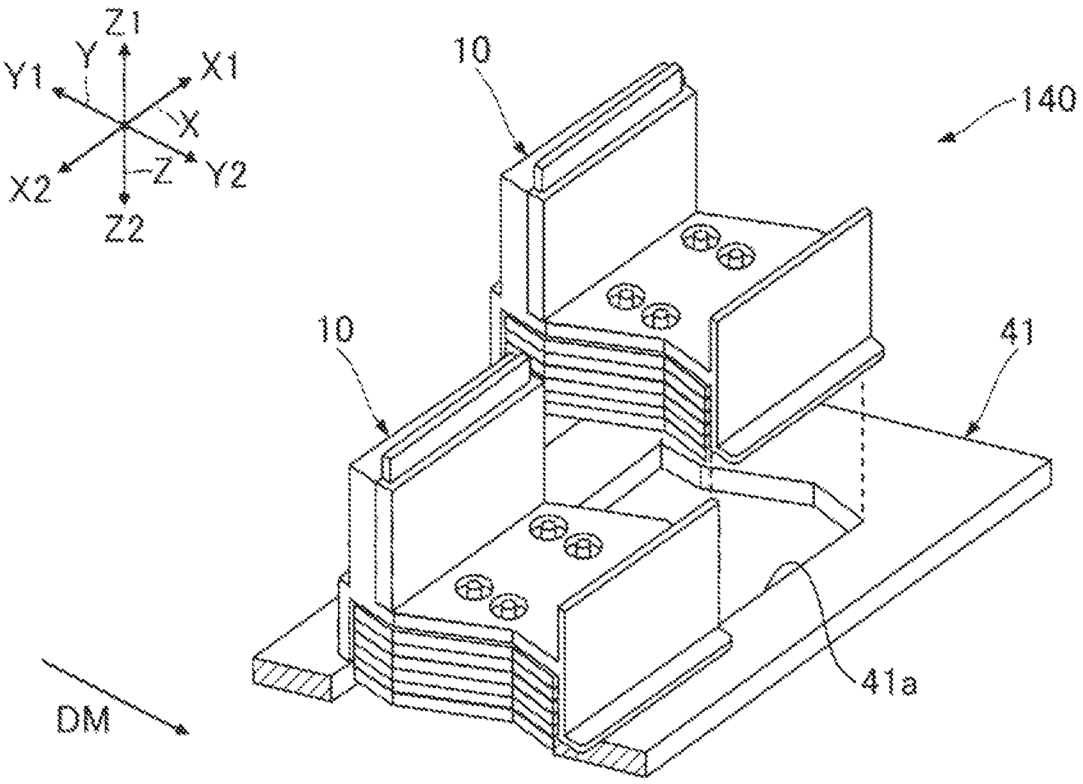
FIG. 3 is a perspective view of a liquid ejecting module.

FIG. 3 is a perspective view of the liquid ejecting module 140. As illustrated in FIG. 3, the liquid ejecting module 140 has a support body 41 and the plurality of liquid ejecting heads 10. The support body 41 is a member that supports the plurality of liquid ejecting heads 10. In an example illustrated in FIG. 3, the support body 41 is a plate-shaped member made of metal or the like, and is provided with mount holes 41*a* for mounting the plurality of liquid ejecting heads 10. The plurality of liquid ejecting heads 10 are inserted into the mount holes 41*a* in a state of being lined up in a direction along the X axis. Each liquid ejecting head 10 is fixed to the support body 41 by screwing or the like. FIG. 3 illustrates two liquid ejecting heads as a representative. The number of liquid ejecting heads in the liquid ejecting module 140 is optional. In addition, the shape of the support body 41 and the like are not limited to the example illustrated in FIG. 3, and are optional.

1-4. Liquid Ejecting Head 10

Figure 4:
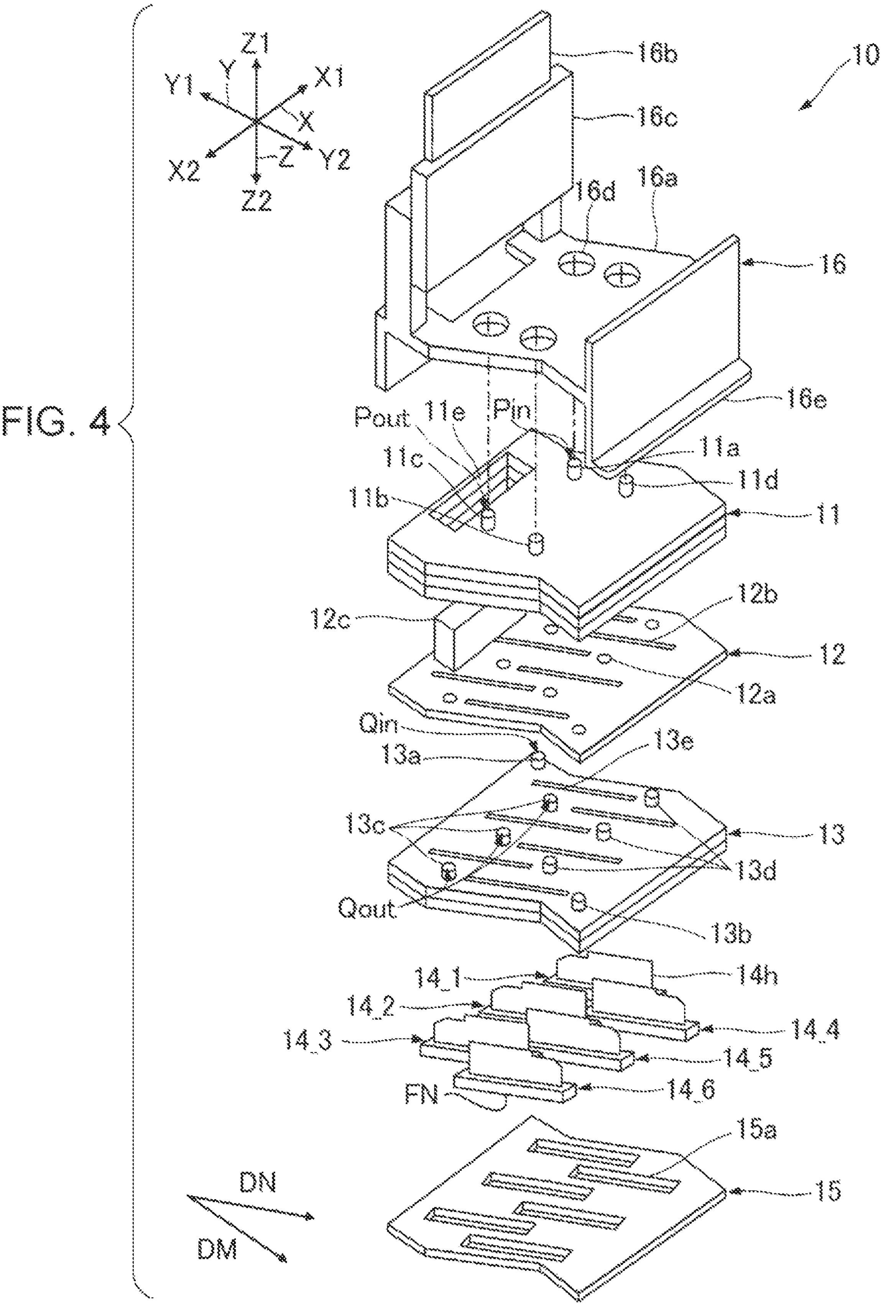
FIG. 4 is an exploded perspective view of a liquid ejecting head illustrated in FIG. 3.

FIG. 4 is an exploded perspective view of the liquid ejecting head 10 illustrated in FIG. 3. As illustrated in FIG. 4, the liquid ejecting head 10 has a flow path structure 11, a wiring substrate 12, a holder 13, a plurality of head chips 14_1, 14_2, 14_3, 14_4, 14_5, and 14_6, a fixing plate 15, and a base 16. These are disposed in the order of the base 16, the flow path structure 11, the wiring substrate 12, the holder 13, the plurality of head chips 14_1, 14_2, 14_3, 14_4, 14_5, and 14_6, and the fixing plate 15 in the Z2 direction. Hereinafter, each portion of the liquid ejecting head 10 will be described in sequence. In the following, each of the head chips 14_1, 14_2, 14_3, 14_4, 14_5, and 14_6 may be described as a head chip 14.

The flow path structure 11 is a structure in which a flow path for flowing the ink between the circulation mechanism 150 and the plurality of head chips 14 are provided inside. As illustrated in FIG. 4, the flow path structure 11 is provided with a coupling tube 11*a*, a coupling tube lib, a coupling tube 11*c*, a coupling tube 11*d*, and a hole 11*e*.

Here, although not illustrated in FIG. 4, two in-structure supply flow paths CC1 and CC2 and two in-structure discharge flow paths CM1 and CM2 are provided inside the flow path structure 11. Each of the in-structure supply flow paths CC1 and CC2 is a flow path for supplying the ink to the plurality of head chips 14. A filter 25 for capturing foreign matter and the like is installed in the middle of each of the two in-structure supply flow paths CC1 and CC2. The in-structure discharge flow paths CM1 and CM2 are flow paths through which the ink is discharged from the plurality of head chips 14. The flow path of the flow path structure 11 will be described with reference to FIGS. 5 and 11 which will be described later.

The coupling tubes 11*a*, 11*b*, 11*c*, and 11*d* are tube bodies protruding in the Z1 direction. More specifically, the coupling tube 11*a* is a tube body that constitutes a flow path through which the first ink is supplied to the in-structure supply flow path CC1. In addition, the coupling tube 11*b* is a tube body that constitutes a flow path through which the second ink is supplied to the in-structure supply flow path CC2. Meanwhile, the coupling tube 11*c* is a tube body that constitutes a flow path through which the first ink is discharged from the in-structure discharge flow path CM1. In addition, the coupling tube 11*d* is a tube body that constitutes a flow path through which the second ink is discharged from the in-structure discharge flow path CM2. The hole 11*e* is a hole for inserting a connector 12*c* which will be described later. An opening of the coupling tube 11*a* is the liquid supply port Pin. An opening of the coupling tube 11*c* is the liquid discharge port Pout.

The wiring substrate 12 is a mount component that electrically couples the plurality of head chips 14 and an assembly substrate 16*b* which will be described later. The wiring substrate 12 is, for example, a rigid wiring substrate. The wiring substrate 12 is disposed between the flow path structure 11 and the holder 13, and the connector 12*c* is installed on a surface of the wiring substrate 12 facing the flow path structure 11. The connector 12*c* is a coupling component coupled to the assembly substrate 16*b* which will be described later. In addition, the wiring substrate 12 is provided with a plurality of holes 12*a* and a plurality of opening portions 12*b*. Each hole 12*a* is a hole for allowing coupling between the flow path structure 11 and the holder 13. Each opening portion 12*b* is a hole through which the wiring substrate 14*h* coupling the head chip 14 and the wiring substrate 12 is passed. The wiring substrate 14*h* is coupled to a surface of the wiring substrate 12 facing the Z1 direction. The wiring substrate 14*h* is a member including wiring electrically coupled to a piezoelectric element 14*e* which will be described later, and is, for example, an FPC, a COF, or the like. The FPC is an abbreviation of flexible printed circuits. The COF is an abbreviation of a chip on film.

The holder 13 is a structure that accommodates and supports the plurality of head chips 14. For example, the holder 13 is made of a resin material or a metal material. The holder 13 has a plate shape that extends in a direction perpendicular to the Z axis. In addition, the holder 13 is provided with a coupling tube 13*a*, a coupling tube 13*b*, a plurality of coupling tubes 13*c*, a plurality of coupling tubes 13*d*, and a plurality of wiring holes 13*e*. Although not illustrated in the drawing, a plurality of recessed portions that accommodate the plurality of head chips 14 are provided on the surface of the holder 13 facing the Z2 direction.

In the present embodiment, the holder 13 holds six head chips 14_1 to 14_6. These head chips 14 are arranged in the X2 direction in the order of head chips 14_1, 14_4, 14_2, 14_5, 14_3, and 14_6. Here, the head chips 14_1 to 14_3 are disposed at positions shifted in the Y1 direction with respect to the head chips 14_4 to 14_6. However, the head chips 14_1 to 14_6 have portions that overlap each other as viewed in the X1 direction or the X2 direction. The arrangement directions DN of the plurality of nozzles N which will be described later in the head chips 14_1 to 14_6 are parallel to each other. Furthermore, each of the head chips 14_1 to 14_6 is disposed such that the arrangement direction DN is inclined with respect to the direction DM which is the transport direction of the medium M.

Here, although not illustrated in FIG. 4, inside the holder 13, two in-holder supply flow paths SP1 and SP2, in-holder discharge flow paths DS1 and DS2 for each head chip 14, and a plurality of bypass flow paths BP1 and BP2 are provided. Each of the in-holder supply flow paths SP1 and SP2 is a flow path having a branch for supplying ink to the plurality of head chips 14. The in-holder discharge flow paths DS1 and DS2 are flow paths for introducing the ink discharged from the head chip 14 into the in-structure discharge flow path CM1 of the flow path structure 11. The bypass flow paths BP1 and BP2 are provided for each head chip 14, and are bypass flow paths through which a first common liquid chamber R1 communicates with a second common liquid chamber R2 which will be described later. The flow path of the holder 13 will be described with reference to FIGS. 6 to 8 which will be described later.

In the present embodiment, among the head chips 14_1 to 14_6, the first ink is supplied to the head chips 14_1 to 14_3, and the second ink is supplied to the head chips 14_4 to 14_6.

The coupling tubes 13a, 13b, 13c, and 13d are tubular protrusions protruding in the Z1 direction. More specifically, the coupling tube 13a is a tube body that constitutes a flow path for supplying the first ink to the in-holder supply flow path SP1, and communicates with the in-structure supply flow path CC1 of the flow path structure 11. In addition, the coupling tube 13b is a tube body that constitutes a flow path for supplying the second ink to the in-holder supply flow path SP2, and communicates with the in-structure supply flow path CC2 of the flow path structure 11. Meanwhile, the coupling tube 13c is a tube body that constitutes a flow path for discharging the first ink to the in-holder discharge flow path DS1, and communicates with the in-structure discharge flow path CM1 of the flow path structure 11. In addition, the coupling tube 13d is a tube body that constitutes a flow path for discharging the second ink to the in-holder discharge flow path DS2, and communicates with the in-structure discharge flow path CM2 of the flow path structure 11. The wiring hole 13e is a hole through which the wiring substrate 14h coupling the head chip 14 and the wiring substrate 12 is passed.

Each head chip 14 ejects the ink. Specifically, although not illustrated in FIG. 4, each head chip 14 has a plurality of nozzles N for ejecting the first ink and a plurality of nozzles N for ejecting the second ink. The nozzles N are provided on a nozzle surface FN, which is a surface of each head chip 14 facing the Z2 direction. Details of the head chip 14 will be described with reference to FIG. 7, which will be described later.

The fixing plate 15 is a plate member which fixes the plurality of head chips 14 to the holder 13. Specifically, the fixing plate 15 is disposed in a state in which the plurality of head chips 14 are sandwiched between the fixing plate 15 and the holder 13, and is fixed to the holder 13 with an adhesive. The fixing plate 15 is made of, for example, a metal material. The fixing plate 15 is provided with a plurality of opening portions 15a for exposing the nozzles N of the plurality of head chips 14. In an example illustrated in FIG. 4, the plurality of opening portions 15a are individually provided for each head chip 14.

The base 16 is a member which fixes the flow path structure 11, the wiring substrate 12, the holder 13, the plurality of head chips 14, and the fixing plate 15 to the above-mentioned support body 41. The base 16 has a main body 16a, the assembly substrate 16b, and a cover 16c.

The main body 16a holds the flow path structure 11 and the wiring substrate 12 disposed between the base 16 and the holder 13 by being fixed to the holder 13 by screwing or the like. The main body 16a is made of, for example, a resin material or the like. The main body 16a has a plate-shaped portion facing the plate-shaped portion of the flow path structure 11 described above, and the plate-shaped portion is provided with a plurality of holes 16d into which the coupling tubes 11a, 11b, 11c, and 11d described above are inserted. The main body 16a has a portion extending in the Z2 direction from the plate-shaped portion, and a tip of the portion is provided with a flange 16e to be fixed to the support body 41 described above.

The assembly substrate 16b is a mount component for electrically coupling the control module 120 and the wiring substrate 12 described above. The assembly substrate 16b is, for example, a rigid wiring substrate. The cover 16c is a plate-shaped member which protects the assembly substrate 16b and fixes the assembly substrate 16b to the main body 16a. The cover 16c is made of, for example, a resin material or the like, and is fixed to the main body 16a by screwing or the like.

1-5. Flow Path in Liquid Ejecting Apparatus 100

Figure 5:
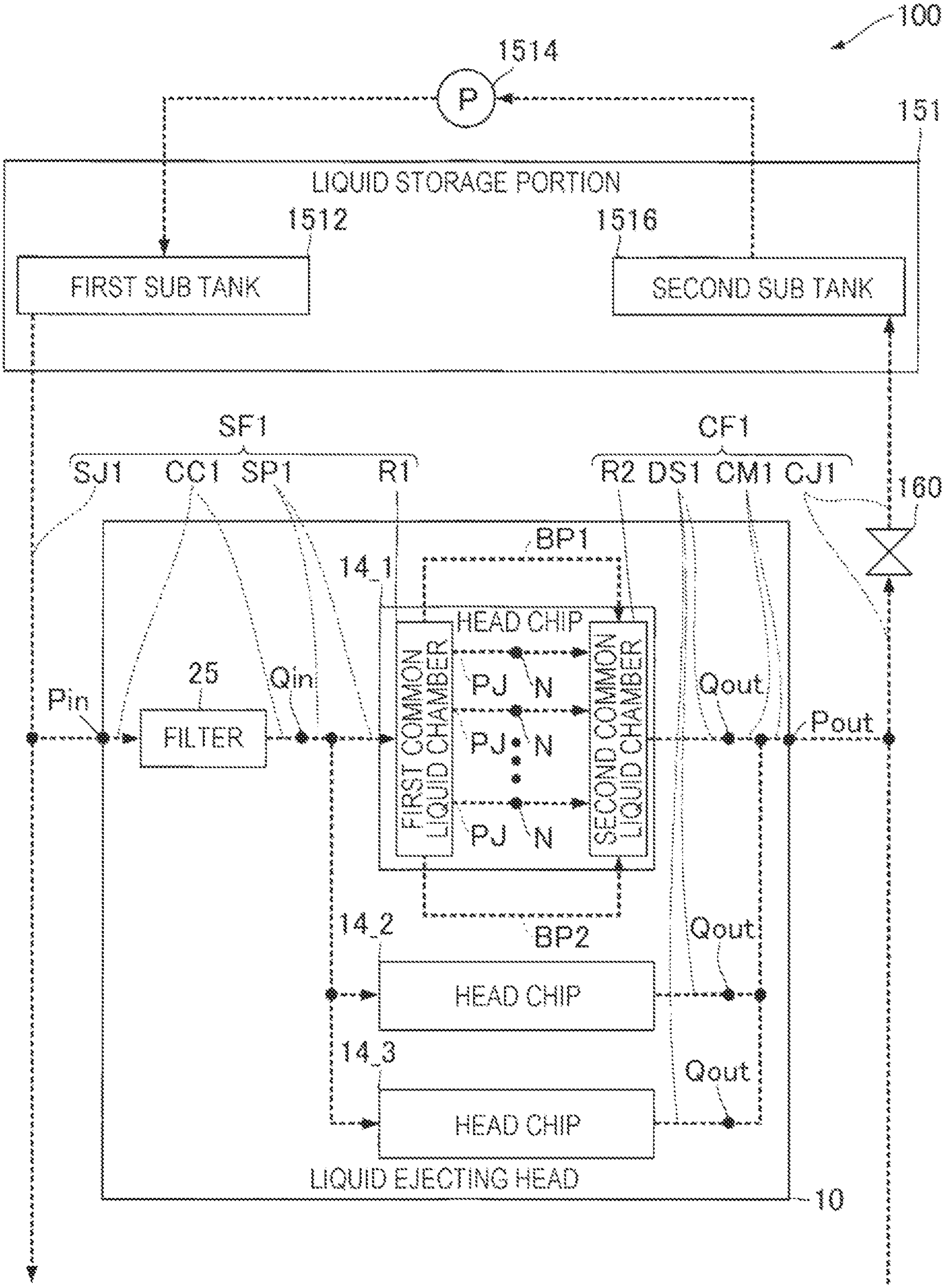
FIG. 5 is a schematic view illustrating a flow path in the liquid ejecting apparatus.

FIG. 5 is a schematic view illustrating the flow path in the liquid ejecting apparatus 100. FIG. 5 illustrates the flow path through which the first ink flows. As described above, among the head chips 14_1 to 14_6, the head chips 14 to which the first ink is supplied are the head chips 14_1 to 14_3. Therefore, in FIG. 5, the head chips 14_1 to 14_3 are displayed inside the liquid ejecting head 10. Since the flow path through which the second ink flows is the same as the flow path through which the first ink flows, the illustration and description thereof will be omitted.

As illustrated in FIG. 5, the liquid ejecting apparatus 100 has a plurality of individual flow paths PJ communicating with each of the plurality of nozzles N, a liquid storage portion 151, a supply flow path SF1 for supplying the first ink from the liquid storage portion 151 to the plurality of individual flow paths PJ, a recovery flow path CF1 for recovering the first ink from the plurality of individual flow paths PJ to the liquid storage portion 151, the bypass flow paths BP1 and BP2 that couple the supply flow path SF1 and the recovery flow path CF1 without passing through any of the plurality of individual flow paths PJ, and the on-off valve 160 that can close and open the recovery flow path CF1. In the following description, the bypass flow paths BP1 and BP2 may be collectively referred to as the bypass flow path BP. As illustrated in FIG. 5, the on-off valve 160 is disposed between the bypass flow path BP and the liquid storage portion 151 in the recovery flow path CF1. The plurality of individual flow paths PJ and the plurality of nozzles N have a one-to-one correspondence with each other. The individual flow path PJ will be described with reference to FIG. 6.

As described above, since the compressor 152 generates only pressure higher than the pressure generated by the vacuum pump 154, the ink in the supply flow path SF1 flows only in a direction in which the first ink flows from the liquid storage portion 151 to the plurality of individual flow paths PJ via the supply flow path SF1.

As illustrated in FIG. 5, the supply flow path SF1 for supplying the first ink includes the in-apparatus supply flow path SJ1 illustrated in FIG. 2 and the in-head supply flow path described above. The in-head supply flow path includes the in-structure supply flow path CC1, the in-holder supply flow path SP1, and the first common liquid chamber R1 of each of the head chips 14_1 to 14_3. In addition, the recovery flow path CF1 has the in-apparatus recovery flow path CJ1 illustrated in FIG. 2 and the in-head discharge flow path described above. The in-head discharge flow path includes the second common liquid chamber R2 of each of the head chips 14_1 to 14_3, the in-holder discharge flow path DS1, and the in-structure discharge flow path CM1.

The in-structure supply flow path CC1 is a flow path for supplying the first ink introduced from the liquid supply port Pin of the coupling tube 11a to the in-holder supply flow path SP1. As illustrated in FIG. 5, a filter 25 is provided in the in-structure supply flow path CC1. As illustrated in FIG. 5, the bypass flow path BP is provided downstream of the filter 25.

The in-holder supply flow path SP1 is a flow path for supplying the first ink introduced from the in-structure supply flow path CC1 via a liquid supply port Qin of the coupling tube 13a to the head chips 14_1 to 14_3. The liquid supply port Qin is an opening of the coupling tube 13a illustrated in FIG. 4. The in-holder supply flow path SP1 has three branched portions for supplying the first ink to the head chips 14_1 to 14_3.

The first common liquid chamber R1 stores the first ink to be supplied to each individual flow path PJ. The first common liquid chamber R1 stores the first ink supplied from the in-holder supply flow path SP1. The second common liquid chamber R2 stores the first ink discharged from each individual flow path PJ without being ejected. The first common liquid chamber R1 and the second common liquid chamber R2 communicate with each other via the plurality of individual flow paths PJ. In addition, the bypass flow paths BP1 and BP2 are coupled to the first common liquid chamber R1 and the second common liquid chamber R2. The bypass flow paths BP1 and BP2 are flow paths that bypass the plurality of individual flow paths PJ and through which the first common liquid chamber R1 communicates with the second common liquid chamber R2, and are provided in the holder 13. The bypass flow path BP is not provided with the nozzle N. Details of the bypass flow paths BP1 and BP2 will be described with reference to FIGS. 6, 8, 9, and 10 which will be described later.

The in-holder discharge flow path DS1 is provided for each head chip 14 that uses the first ink, and is a flow path for discharging the first ink introduced from the head chip 14 from a liquid discharge port Qout of the coupling tube 13*c*. The liquid discharge port Qout is an opening of the coupling tube 13*c* illustrated in FIG. 4.

The in-structure discharge flow path CM1 is a flow path for supplying the first ink introduced from the in-holder discharge flow path DS1 via the liquid discharge port Qout to the in-apparatus recovery flow path CJ1.

The circulation mechanism 150 executes a circulation operation of circulating the first ink in the order of the liquid storage portion 151, the supply flow path SF1, the individual flow path PJ, the recovery flow path CF1, and the liquid storage portion 151. That is, the liquid storage portion 151, the supply flow path SF1, the individual flow path PJ, and the recovery flow path CF1 constitute a circulation path through which the first ink circulates. The upstream in the present specification means an upstream portion of the circulation path in the circulation operation unless otherwise specified. The downstream in the present specification means a downstream of the circulation path in the circulation operation unless otherwise specified. That is, a coupling position between the liquid storage portion 151 (first sub tank 1512) and the supply flow path SF1 is the most upstream position in the circulation path, and a coupling position between the liquid storage portion 151 (second sub tank 1516) and the recovery flow path CF1 is the most downstream position. Therefore, in the first embodiment, when one element of the two elements is close to the first sub tank 1512 with respect to the other element, it means that one element is located upstream with respect to the other element. Similarly, when one element of the two elements is close to the second sub tank 1516 with respect to the other element, it means that one element is located downstream with respect to the other element.

1-6. Head Chip 14

Figure 6:
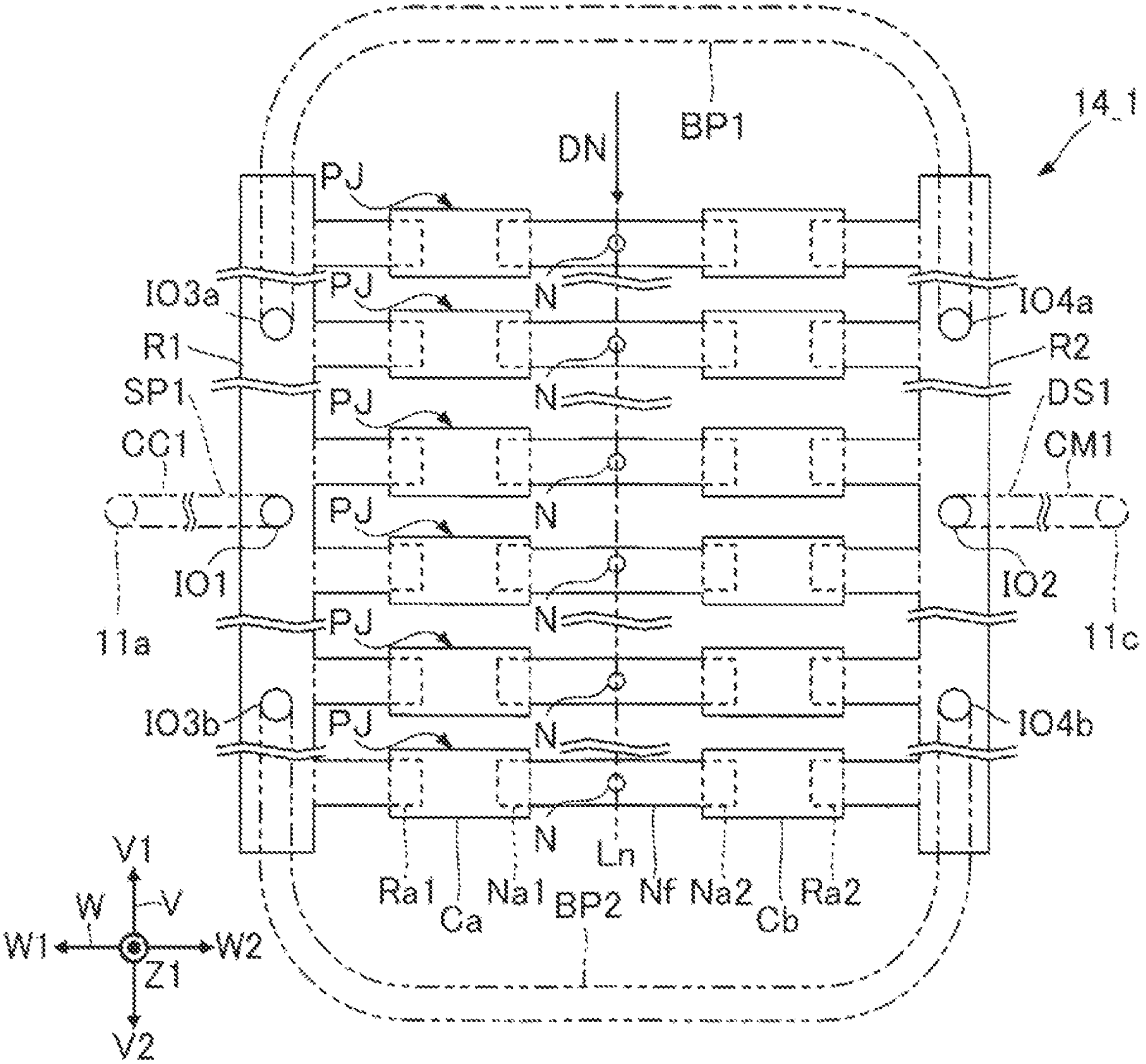
FIG. 6 is a plan view schematically illustrating a flow path of a head chip.

FIG. 6 is a plan view schematically illustrating the flow path of the head chip 14_1. The following description will be given by appropriately using a V axis and a W axis in addition to the X axis, the Y axis, and the Z axis for convenience. In addition, one direction along the V axis is a V1 direction, and a direction opposite to the V1 direction is a V2 direction. Similarly, the directions opposite to each other along the W axis are a W1 direction and a W2 direction.

Here, the V axis is an axis along an arrangement direction of the plurality of nozzles N which will be described later, and is an axis that is obtained by rotating the Y axis around the Z axis at a predetermined angle. The W axis is an axis that is obtained by rotating the X axis around the Z axis at the predetermined angle. Therefore, the V axis and the W axis are typically orthogonal to each other, but are not limited to this, and may intersect at an angle within a range of, for example, 80 degrees or more and 100 degrees or less. In addition, the predetermined angle, that is, the angle which is formed by the V axis and the Y axis, or the angle which is formed by the W axis and the X axis is, for example, within a range of 40 degrees or more and 60 degrees or less.

In FIG. 6, among the head chips 14_1 to 14_6, the flow path of the head chip 14_1 is illustrated as a representative.

As illustrated in FIG. 6, the head chip 14 is provided with the plurality of nozzles N, a plurality of individual flow paths PJ, the first common liquid chamber R1, and the second common liquid chamber R2. As illustrated by a chain double-dashed line in FIG. 6, the bypass flow paths BP1 and BP2 are coupled to the first common liquid chamber R1 and the second common liquid chamber R2.

The head chip 14 has a surface facing the medium M, and as illustrated in FIG. 6, the plurality of nozzles N are provided on the surface. The plurality of nozzles N are arranged along the V axis. Each of the plurality of nozzles N ejects the ink in the Z2 direction.

Here, a set of the plurality of nozzles N constitutes a nozzle row Ln. In addition, the plurality of nozzles N are arranged at equal intervals at a predetermined pitch. The predetermined pitch is a distance between the centers of the plurality of nozzles N in the direction along the V axis.

The individual flow path PJ communicates with each of the plurality of nozzles N. Each of the plurality of individual flow paths PJ extends along the W axis and communicates with the nozzles N that are different from each other. The plurality of individual flow paths PJ are arranged along the V axis.

As illustrated in FIG. 6, each individual flow path PJ has a pressure chamber Ca, a pressure chamber Cb, a nozzle flow path Nf, an individual supply flow path Ra1, an individual discharge flow path Ra2, a first communication flow path Na1, and a second communication flow path Na2.

Each of the pressure chamber Ca and the pressure chamber Cb in each individual flow path PJ extends along the W axis and is a space in which the ink ejected from the nozzle N communicating with the individual flow path PJ is stored. In an example illustrated in FIG. 6, the plurality of pressure chambers Ca are arranged along the V axis. Similarly, a plurality of the pressure chambers Cb are arranged along the V axis. In each individual flow path PJ, positions of the pressure chamber Ca and the pressure chamber Cb in the direction along the V axis are the same in the example illustrated in FIG. 6, but may be different from each other. In the following, when the pressure chamber Ca and the pressure chamber Cb are not particularly distinguished, each pressure chamber may be referred to as "pressure chamber C".

The nozzle flow path Nf is disposed between the pressure chamber Ca and the pressure chamber Cb in each individual flow path PJ. Here, the pressure chamber Ca communicates with the nozzle flow path Nf via the first communication flow path Na1 which extends along the Z axis. The pressure chamber Cb communicates with the nozzle flow path Nf via the second communication flow path Na2 which extends along the Z axis.

In each individual flow path PJ, the nozzle flow path Nf is a space which extends along the W axis. In addition, the plurality of nozzle flow paths Nf are arranged along the V axis at intervals from each other. The nozzle N is provided in each nozzle flow path Nf. In each nozzle flow path Nf, the ink is ejected from the nozzle N by changing the pressure in the pressure chamber Ca and the pressure chamber Cb described above.

Each of the first communication flow path Na1 and the second communication flow path Na2 is a space which extends along the Z axis. The first communication flow path Na1 and the second communication flow path Na2 may be provided as necessary, and may be removed.

The first common liquid chamber R1 and the second common liquid chamber R2 communicate with the plurality of individual flow paths PJ. Here, the pressure chamber Ca communicates with the first common liquid chamber R1 via the individual supply flow path Ra1 which extends along the Z axis. The pressure chamber Cb communicates with the second common liquid chamber R2 via the individual discharge flow path Ra2 which extends along the Z axis.

Each of the first common liquid chamber R1 and the second common liquid chamber R2 is a space which extends along the V axis throughout the entire range in which the plurality of nozzles N are distributed. Here, the first common liquid chamber R1 is coupled to an end of each individual flow path PJ in the W2 direction. The first common liquid chamber R1 stores the ink for supplying to each individual flow path PJ. Meanwhile, the second common liquid chamber R2 is coupled to an end of each individual flow path PJ in the W1 direction. The second common liquid chamber R2 stores the ink discharged from each individual flow path PJ without being ejected.

The first common liquid chamber R1 is provided with a supply port IO1, a discharge port IO3*a*, and a discharge port IO3*b*. The supply port IO1 is a tube path for introducing the ink from the in-holder supply flow path SP1 of the holder 13 into the first common liquid chamber R1. The discharge port IO3*a* is a tube path for discharging the ink from the first common liquid chamber R1 to the bypass flow path BP1. The discharge port IO3*b* is a tube path for discharging the ink from the first common liquid chamber R1 to the bypass flow path BP2.

Here, the in-holder supply flow path SP1 is coupled to the circulation mechanism 150 via the in-structure supply flow path CC1 of the flow path structure 11.

The second common liquid chamber R2 is provided with a discharge port 102, an introduction port IO4*a*, and an introduction port IO4*b*. The discharge port 102 is a tube path for discharging the ink from the second common liquid chamber R2 to the in-holder discharge flow path DS1 of the holder 13. The introduction port IO4*a* is a tube path for introducing the ink from the bypass flow path BP1 to the second common liquid chamber R2. The introduction port IO4*b* is a tube path for introducing the ink from the bypass flow path BP2 into the second common liquid chamber R2.

Here, the in-holder discharge flow path DS1 is coupled to the circulation mechanism 150 via the in-structure discharge flow path CM1 of the flow path structure 11.

Figure 7:
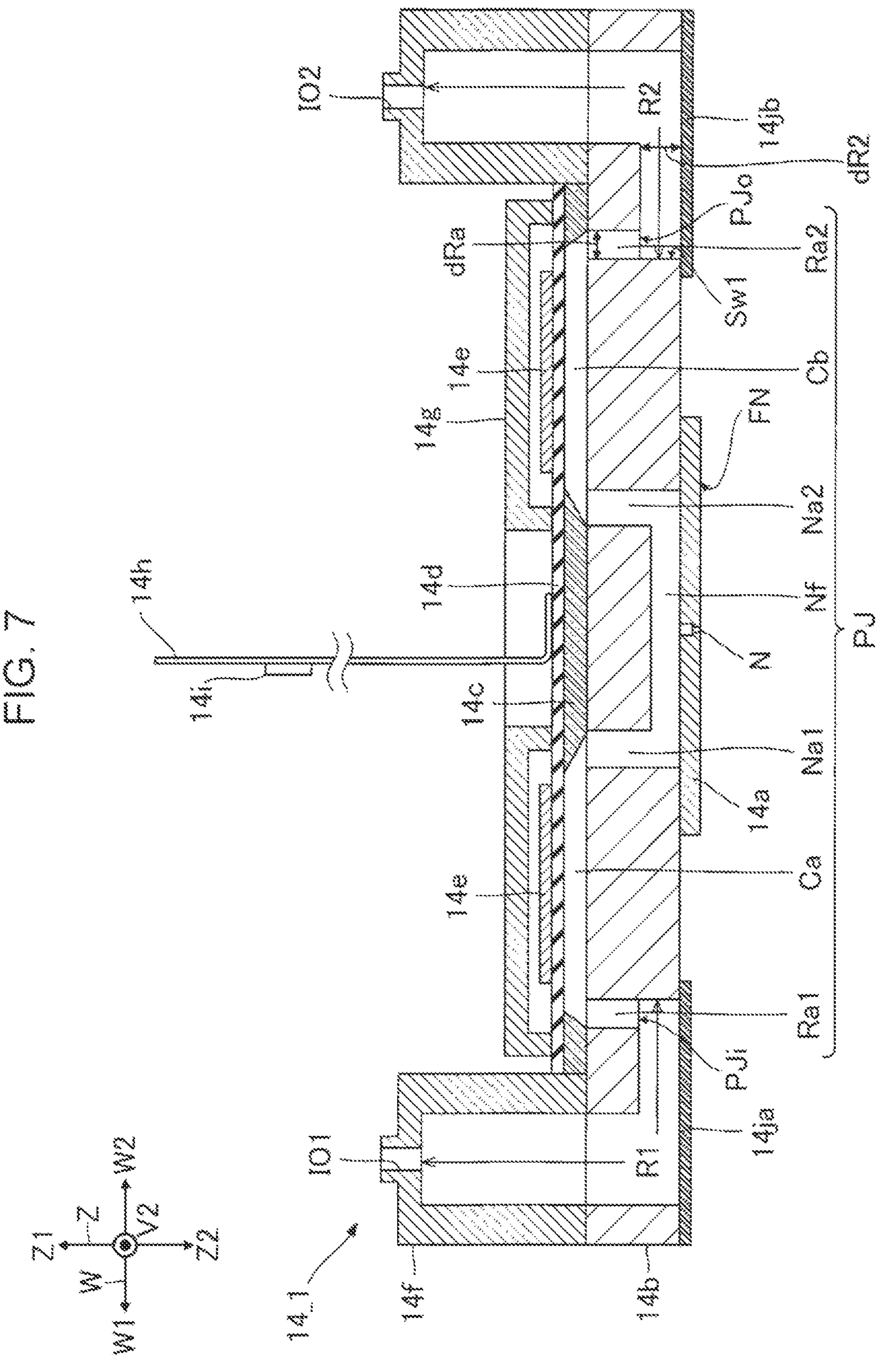
FIG. 7 is a cross-sectional view of a head chip.

FIG. 7 is a cross-sectional view of the head chip 14. FIG. 7 illustrates a cross section of the head chip 14 which is cut in a plane including the W axis and the Z axis. As illustrated in FIG. 7, the head chip 14 has a nozzle substrate 14*a*, a flow path substrate 14*b*, a pressure chamber substrate 14*c*, a vibration plate 14*d*, a plurality of piezoelectric elements 14*e*, a case 14*f*, a protective plate 14*g*, a wiring substrate 14*h*, a flexible member 14*ja*, and a flexible member 14*jb*.

The nozzle substrate 14*a*, the flow path substrate 14*b*, the pressure chamber substrate 14*c*, and the vibration plate 14*d* are laminated in this order in the Z1 direction. Each of the members extends along the V axis and is manufactured, for example, by processing a silicon single crystal substrate using a semiconductor processing technique. The members are bonded to each other by an adhesive or the like. It should be noted that another layer such as an adhesive layer or a substrate may be appropriately interposed between two adjacent members among the members.

The plurality of nozzles N are provided on the nozzle substrate 14*a*. Each of the plurality of nozzles N penetrates the nozzle substrate 14*a* and is a through hole through which the ink passes. The plurality of nozzles N are arranged in the direction along the V axis.

The flow path substrate 14*b* is provided with a part of each of the first common liquid chamber R1 and the second common liquid chamber R2 and a portion of the plurality of individual flow paths PJ excluding the pressure chamber Ca and the pressure chamber Cb. That is, the flow path substrate 14*b* is provided with the nozzle flow path Nf, the first communication flow path Na1, the second communication flow path Na2, the individual supply flow path Ra1, and the individual discharge flow path Ra2.

A part of each of the first common liquid chamber R1 and the second common liquid chamber R2 is a space for penetrating the flow path substrate 14*b*. The flexible members 14*ja* and 14*jb* that blocks the opening by the space are installed on the surface of the flow path substrate 14*b* facing the Z2 direction. In the following description, the flexible members 14*ja* and 14*jb* may be collectively referred to as the flexible member 14*j*.

The flexible member 14*j* is a layered member made of an elastic material. One surface of the flexible member 14*ja* defines a part of the first common liquid chamber R1 and the other surface of the flexible member 14*ja* faces a space open to the atmosphere, so that the flexible member 14*ja* absorbs the pressure fluctuation in the first common liquid chamber R1. A surface S14 which is one surface of the flexible member 14*jb* defines a part of the second common liquid chamber R2 and the other surface of the flexible member 14*jb* faces a space open to the atmosphere, so that the flexible member 14*jb* absorbs the pressure fluctuation in the second common liquid chamber R2. Since the flexible member 14*j* absorbs the pressure fluctuations of the first common liquid chamber R1 and the second common liquid chamber R2, these pressure fluctuations are less likely to reach the pressure chamber C. By making it difficult for the pressure fluctuations to reach the pressure chamber C, it is possible to improve the quality of the image formed on the medium M.

A width dR2 from a wall surface of the second common liquid chamber R2 in the Z1 direction in the flow path substrate 14*b* to the flexible member 14*jb* along the Z axis is, for example, about 200 μm in a state in which the flexible member 14*jb* is not deformed. "μm" indicates micrometer.

The nozzle flow path Nf is a space in a groove provided on a surface of the flow path substrate 14*b* facing the Z2 direction. Here, the nozzle substrate 14*a* constitutes a part of the wall surface of the nozzle flow path Nf.

Each of the first communication flow path Na1 and the second communication flow path Na2 is a space for penetrating the flow path substrate 14*b*.

Each of the individual supply flow path Ra1 and the individual discharge flow path Ra2 is a space for penetrating the flow path substrate 14*b*. The individual supply flow path Ra1 causes the first common liquid chamber R1 to communicate with the pressure chamber Ca so as to supply the ink from the first common liquid chamber R1 to the pressure chamber Ca. Here, one end of the individual supply flow path Ra1 is opened on a surface of the flow path substrate 14*b* facing the Z1 direction. On the other hand, the other end of the individual supply flow path Ra1 is an upstream end of the individual flow path PJ and is an opening PJi on the wall surface of the first common liquid chamber R1 in the flow path substrate 14*b*. On the other hand, the individual discharge flow path Ra2 causes the second common liquid chamber R2 to communicate with the pressure chamber Cb so as to discharge the ink from the pressure chamber Cb to the second common liquid chamber R2. Here, one end of the individual discharge flow path Ra2 is opened on the surface of the flow path substrate 14*b* facing the Z1 direction. On the other hand, the other end of the individual discharge flow path Ra2 is a downstream end of the individual flow path PJ, and is an opening PJo of the wall surface of the second common liquid chamber R2 in the flow path substrate 14*b*. The width dRa of the individual discharge flow path Ra2 along the W axis is, for example, from 120 μm to 130 μm.

The pressure chamber substrate 14*c* is provided with the pressure chambers Ca and the pressure chambers Cb of the plurality of individual flow paths PJ. Each of the pressure chamber Ca and the pressure chamber Cb penetrates the pressure chamber substrate 14*c* and is a gap between the flow path substrate 14*b* and the vibration plate 14*d*.

The vibration plate 14*d* is a plate-shaped member which can elastically vibrate. The vibration plate 14*d* is a laminate including, for example, a first layer made of silicon oxide ($SiO_2$) and a second layer made of zirconium oxide ($ZrO_2$). Here, another layer such as a metal oxide may be interposed between the first layer and the second layer. A part or all of the vibration plate 14*d* may be integrally made of the same material as the pressure chamber substrate 14*c*. For example, the vibration plate 14*d* and the pressure chamber substrate 14*c* can be integrally formed by selectively removing a part in a thickness direction of the region corresponding to the pressure chamber C in the plate-shaped member having a predetermined thickness. In addition, the vibration plate 14*d* may be constituted of a layer of a single material.

The plurality of piezoelectric elements 14*e* corresponding to the pressure chambers C different from each other are installed on a surface of the vibration plate 14*d* facing the Z1 direction. Each piezoelectric element 14*e* is configured by, for example, laminating a first electrode and a second electrode facing each other and a piezoelectric layer disposed between the two electrodes. Each piezoelectric element 14*e* fluctuates the pressure of the ink in the pressure chamber C to eject the ink in the pressure chamber C from the nozzle N. When the drive signal Com is supplied, the piezoelectric element 14*e* vibrates the vibration plate 14*d* with its own deformation. With the vibration, the pressure chamber C expands and contracts such that the pressure of the ink in the pressure chamber C fluctuates. The piezoelectric element 14*e* is an example of a drive element. However, the head chip 14 may have a heat generating element instead of the piezoelectric element 14*e*.

The case 14*f* is a case that stores the ink. The case 14*f* is provided with a space constituting a remaining portion other than a part provided on the flow path substrate 14*b* for each of the first common liquid chamber R1 and the second common liquid chamber R2.

The protective plate 14*g* is a plate-shaped member installed on the surface of the vibration plate 14*d* facing the Z1 direction, protects the plurality of piezoelectric elements 14*e*, and reinforces the mechanical strength of the vibration plate 14*d*. Here, a space for accommodating the plurality of piezoelectric elements 14*e* is formed between the protective plate 14*g* and the vibration plate 14*d*.

The wiring substrate 14*h* is mounted on the surface of the vibration plate 14*d* facing the Z1 direction, and is a mount component that electrically couples the control module 120 and the head chip 14. For example, a flexible wiring substrate 14*h* such as a flexible printed circuit (FPC) and a flexible flat cable (FFC) is preferably used. The drive circuit 14*i* described above is mounted on the wiring substrate 14*h*.

In the head chip 14 having the above-described configuration, the ink flows to the first common liquid chamber R1, the individual supply flow path Ra1, the pressure chamber Ca, the nozzle flow path Nf, the pressure chamber Cb, and the individual discharge flow path Ra2 and the second common liquid chamber R2, in this order, by the operation of the circulation mechanism 150 described above.

The pressure of the pressure chamber Ca and the pressure chamber Cb is caused to fluctuate by simultaneously driving the piezoelectric element 14*e* corresponding to both the pressure chamber Ca and the pressure chamber Cb by the drive signal Com from the drive circuit 14*i*. Thereby, the ink is ejected from the nozzle N in accordance with the pressure fluctuation thereof.

1-7. Holder 13

Figure 8:
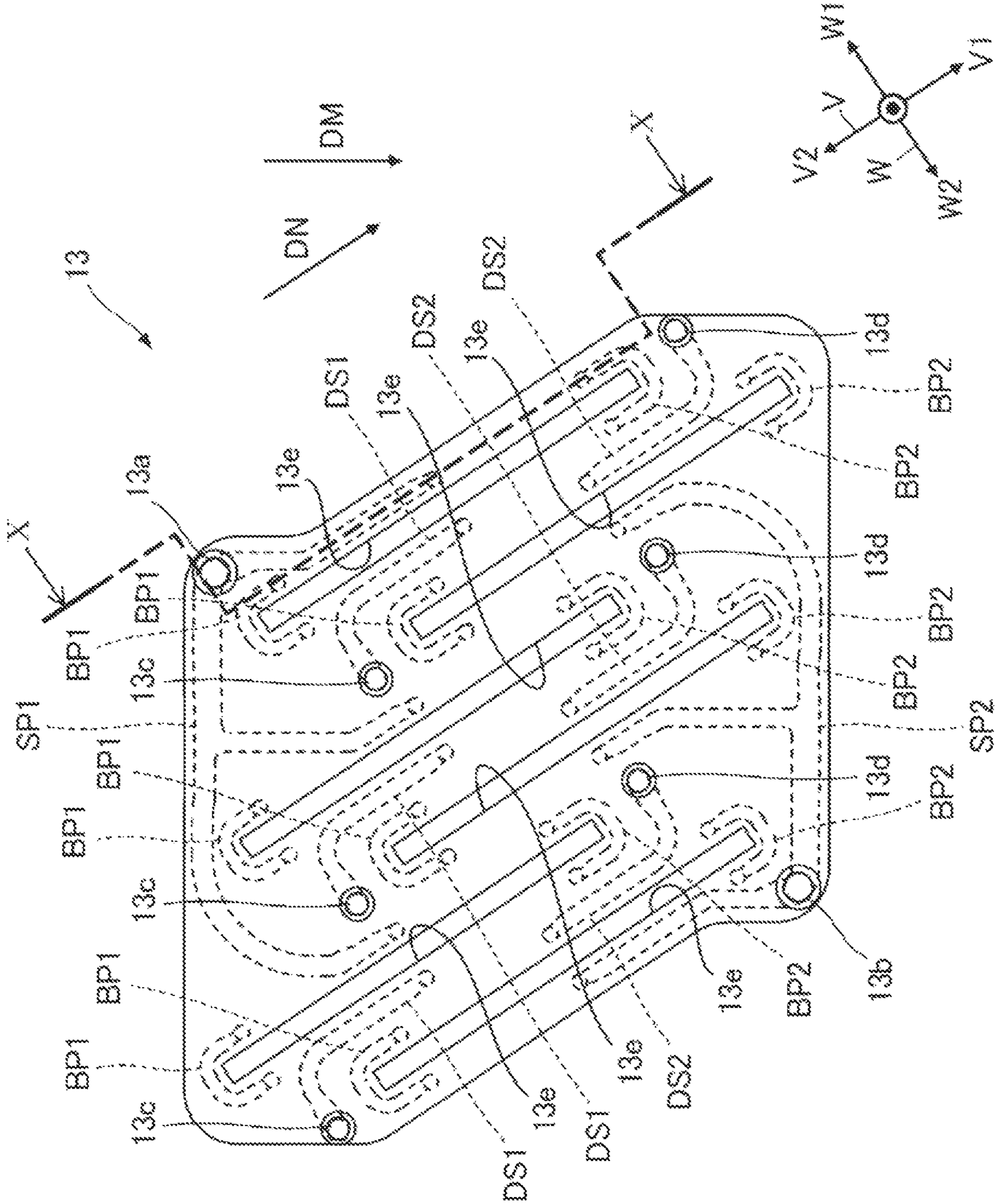
FIG. 8 is a plan view of a holder.
Figure 9:
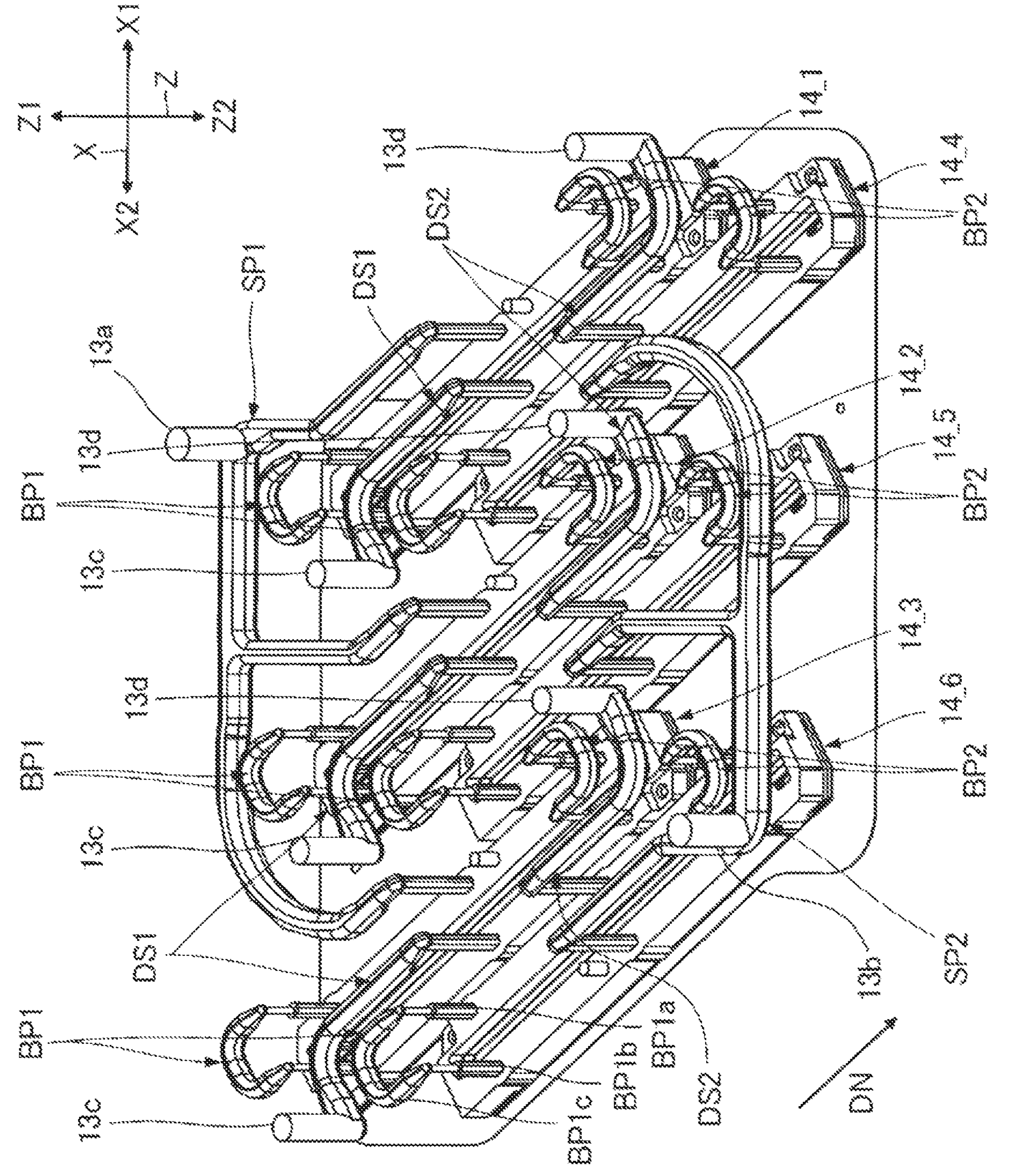
FIG. 9 is a perspective view illustrating a flow path provided in the holder and the head chip.

FIG. 8 is a plan view of the holder 13. FIG. 9 is a perspective view illustrating the flow path provided in the holder 13 and the head chip 14. In FIG. 8, an example of the structure inside the holder 13 as viewed in the Z2 direction is illustrated by a broken line. In FIG. 9, in addition to the flow path of the holder 13 and the plurality of head chips 14, the fixing plate 15 is illustrated.

As illustrated in FIGS. 8 and 9, inside the holder 13, the in-holder supply flow path SP1, the in-holder supply flow path SP2, three in-holder discharge flow paths DS1, three in-holder discharge flow paths DS2, six bypass flow paths BP1, and six bypass flow paths BP2 are provided.

The in-holder supply flow path SP1 is a flow path having three branched portions for supplying the first ink introduced into the coupling tube 13*a* to the three head chips 14. The in-holder supply flow path SP2 is a flow path having three branched portions for supplying the second ink introduced into the coupling tube 13*b* to the three head chips 14.

The in-holder discharge flow path DS1 is provided for each head chip 14 that uses the first ink, and is a flow path for discharging the first ink introduced from the head chip 14 from the coupling tube 13*c*. The in-holder discharge flow path DS2 is provided for each head chip 14 that uses the second ink, and is a flow path for discharging the second ink introduced from the head chip 14 from the coupling tube 13*d*.

Each of the bypass flow path BP1 and bypass flow path BP2 is provided for each head chip 14, and are flow paths through which the above-described first common liquid chamber R1 communicates with the and the above-described second common liquid chamber R2. Here, the bypass flow path BP1 and the bypass flow path BP2 are located opposite each other with respect to the center of the first common liquid chamber R1 or the second common liquid chamber R2 in the direction along the X axis. In an example illustrated in FIG. 8, the bypass flow path BP1 is located in the V2 direction with respect to the bypass flow path BP2. In addition, each of the bypass flow path BP1 and the bypass flow path BP2 has a U shape as viewed in the direction along the Z axis.

Figure 10:
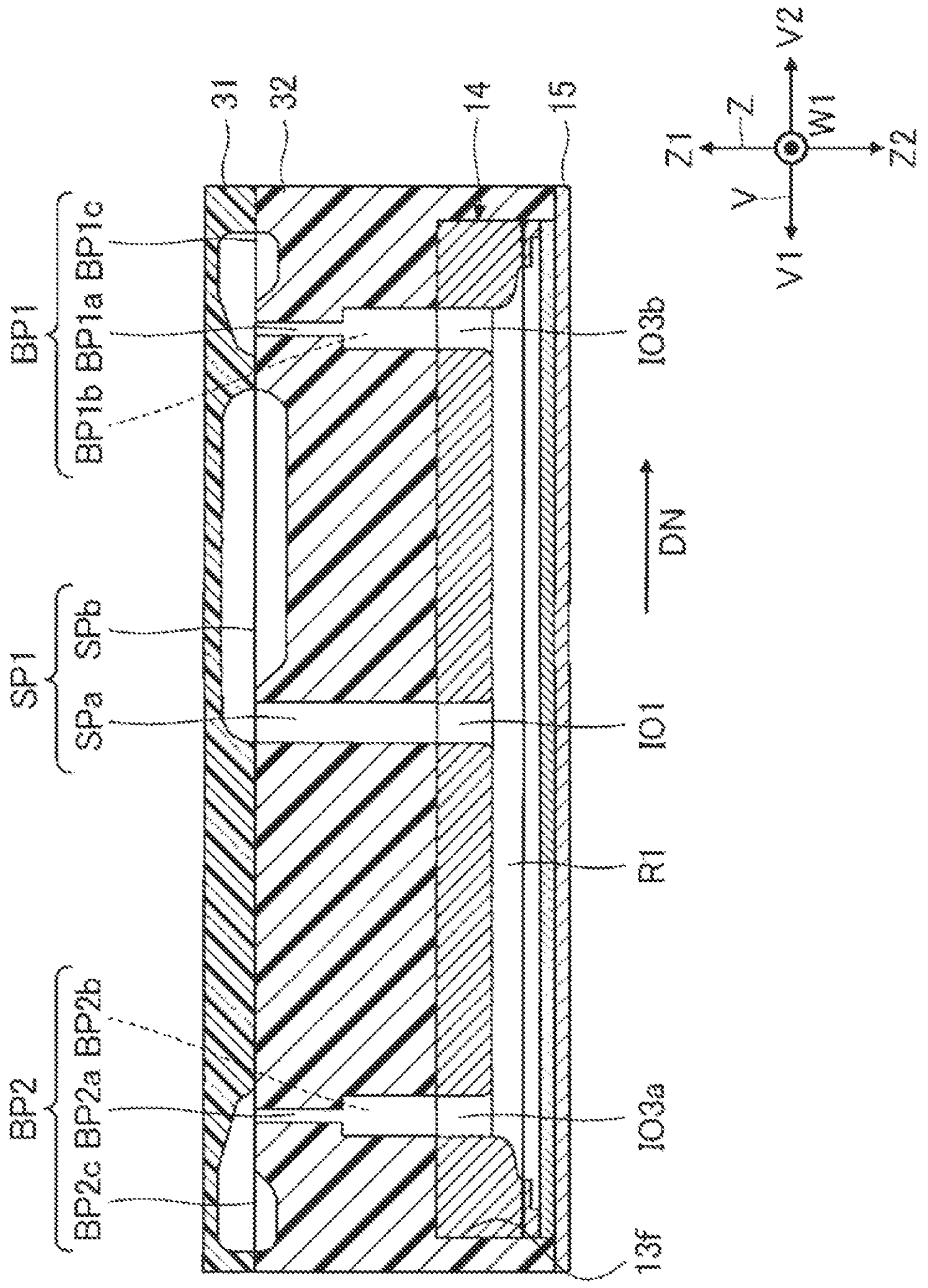
FIG. 10 is a cross-sectional view taken along the line X-X in FIG. 8.

FIG. 10 is a cross-sectional view taken along the line X-X in FIG. 8. In FIG. 10, in addition to the holder 13, the head chip 14 and the fixing plate 15 are illustrated. As illustrated in FIG. 10, the holder 13 has a plate shape that extends in a direction perpendicular to the Z axis. The holder 13 has a layer 31 and a layer 32, which are laminated in this order in the Z2 direction. Each of the layer 31 and the layer 32 is made of, for example, a resin material and is formed by injection molding. The layer 31 and the layer 32 are bonded to each other, for example, with an adhesive.

Each of the above-described flow paths included in the holder 13 is provided in a laminate constituted of the layer 31 and the layer 32, and a recessed portion 13*f* that accommodates the head chip 14 is provided on the surface of the layer 32 facing the Z2 direction. In an example illustrated in FIG. 10, a thickness of the layer 32 is thicker than a thickness of the layer 31. Therefore, the thickness of the layer 32 required for forming the recessed portion 13*f* can be easily secured.

Here, the in-holder supply flow path SP1 has a vertical flow path SPa and a horizontal flow path SPb. The vertical flow path Spa extends in the direction along the Z axis, and is constituted of holes penetrating the layer 32. The horizontal flow path SPb extends in a direction orthogonal to the Z axis, and is provided between the layer 31 and the layer 32. In the example illustrated in FIG. 10, the horizontal flow path SPb is constituted of a groove provided on the surface of the layer 31 facing the Z2 direction and a groove provided on the surface of the layer 32 facing the Z1 direction. Although not illustrated in FIG. 10, the in-holder supply flow path SP2 is configured in the same manner as the in-holder supply flow path SP1.

The bypass flow path BP1 has a first portion BP1*a*, a second portion BP1*b*, and a third portion BP1*c*. Each of the first portion BP1*a* and the second portion BP1*b* extends in the direction along the Z axis and is constituted of holes penetrating the layer 32. The third portion BP1*c* extends in the direction orthogonal to the Z axis, and is provided between the layer 31 and the layer 32. In the example illustrated in FIG. 10, the third portion BP1*c* is constituted of a groove provided on the surface of the layer 31 facing the Z2 direction and a groove provided on the surface of the layer 32 facing the Z1 direction.

Similarly, the bypass flow path BP2 has a first portion BP2*a*, a second portion BP2*b*, and a third portion BP2*c*. Each of the first portion BP2*a* and the second portion BP2*b* extends in the direction along the Z axis and is constituted of holes penetrating the layer 32. The third portion BP2*c* extends in a direction orthogonal to the Z axis, and is provided between the layer 31 and the layer 32. In the example illustrated in FIG. 10, the third portion BP2*c* is constituted of a groove provided on the surface of the layer 31 facing the Z2 direction and a groove provided on the surface of the layer 32 facing the Z1 direction.

In one head chip 14, the sum of flow path resistances of the bypass flow path BP is smaller than the sum of flow path resistances of the plurality of individual flow paths PJ. That is, in one head chip 14, the combined resistance of the bypass flow path BP1 and the bypass flow path BP2 is smaller than the combined resistance of the plurality of individual flow paths PJ.

1-8. Flow Path Structure 11

Figure 11:
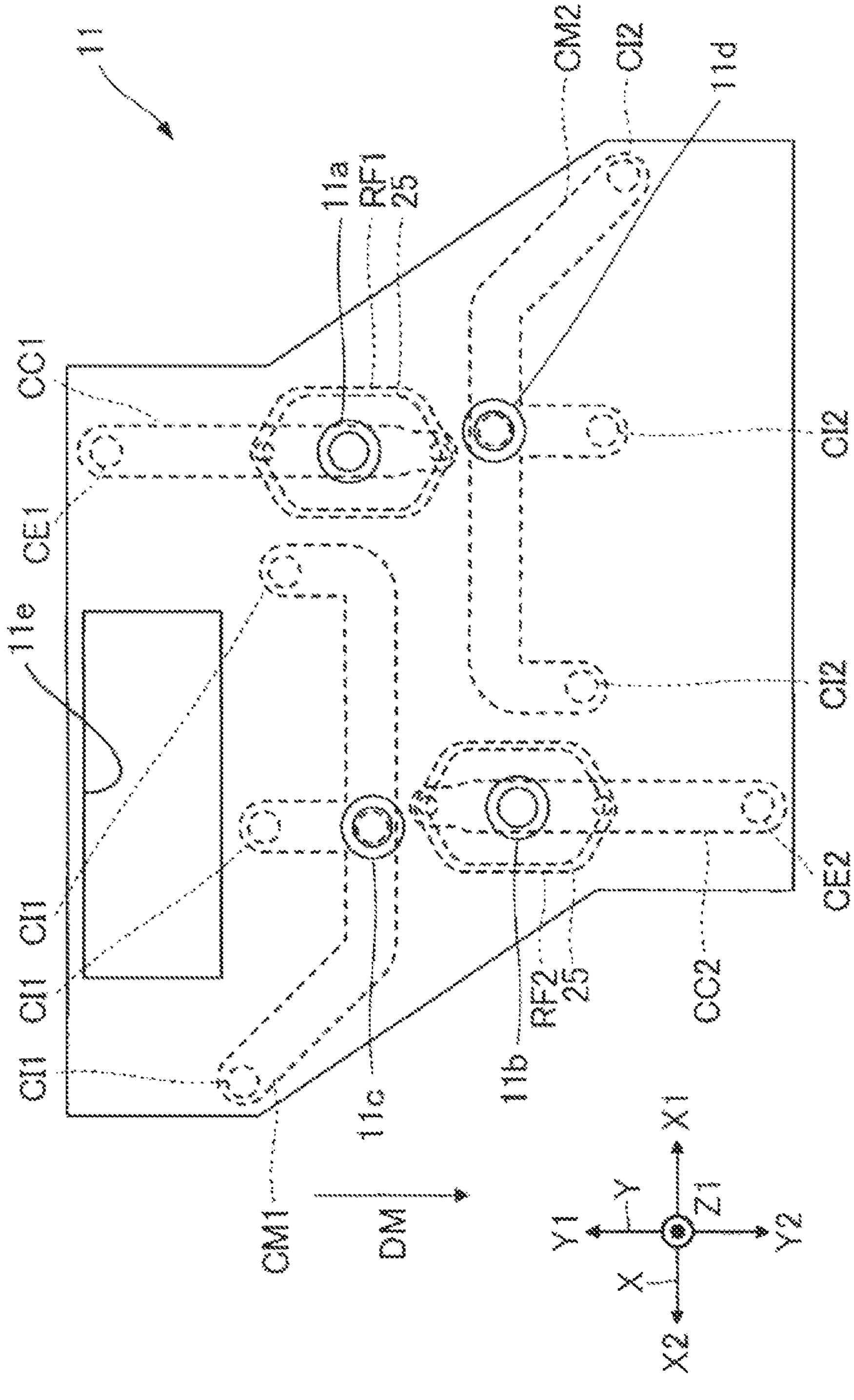
FIG. 11 is a plan view of a flow path structure.

FIG. 11 is a plan view of the flow path structure 11. In FIG. 11, an example of the structure in the flow path structure 11 as viewed in the Z2 direction is illustrated by a broken line. As illustrated in FIG. 11, inside the flow path structure 11, the in-structure supply flow path CC1, the in-structure supply flow path CC2, the in-structure discharge flow path CM1, the in-structure discharge flow path CM2, a first filter chamber RF1, and a second filter chamber RF2 are provided. The filter 25 is provided inside each of the first filter chamber RF1 and the second filter chamber RF2.

The filter 25 is a plate-shaped or sheet-shaped member that captures foreign matter and the like mixed in the ink while allowing the ink to pass therethrough. The filter 25 is made of, for example, a metal fiber such as a twilled dutch weave or a plain dutch weave. The filter 25 is not limited to the configuration using the metal fiber, and may be made of a resin fiber such as non-woven fabric, for example. The filter 25 is typically disposed so as to be parallel to the nozzle surface FN. Here, the filter 25 may be provided so as to be inclined in a range of 0 degrees or more and 45 degrees or less with respect to the nozzle surface FN.

The in-structure supply flow path CC1 is a flow path for supplying the first ink introduced into the coupling tube 11*a* to the holder 13 described above. Here, the in-structure supply flow path CC1 communicates with an internal space of the coupling tube 11*a* via the first filter chamber RF1. A discharge port CE1 coupled to the coupling tube 13*a* described above communicates with the in-structure supply flow path CC1.

The in-structure supply flow path CC2 is a flow path for supplying the second ink introduced into the coupling tube 11*b* to the holder 13 described above. Here, the in-structure supply flow path CC2 communicates with an internal space of the coupling tube 11*b* via the second filter chamber RF2. A discharge port CE2 coupled to the coupling tube 13*b* described above communicates with the in-structure supply flow path CC2.

The in-structure discharge flow path CM1 is a flow path for discharging the first ink from the holder 13 described above from the coupling tube 11*c*. An introduction port CI' coupled to the three coupling tubes 13*c* described above communicates with the in-structure discharge flow path CM1.

The in-structure discharge flow path CM2 is a flow path for discharging the second ink from the holder 13 described above from the coupling tube 11*d*. An introduction port CI2 coupled to the three coupling tubes 13*d* described above communicates with the in-structure discharge flow path CM2.

1-9. Operation at the Time of Filling Ink

A series of processes when the liquid ejecting head 10 is filled with the first ink will be described with reference to FIGS. 12, 13, and 14. With respect to the second ink, the liquid ejecting apparatus 100 executes a series of processes similar to those for the first ink. Hereinafter, a series of processes related to the first ink will be described.

Figure 12:
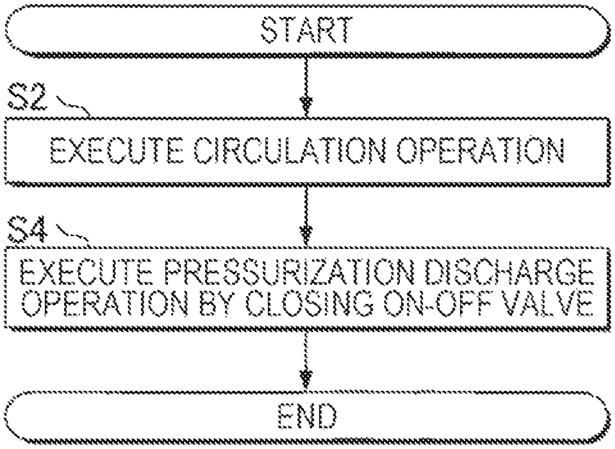
FIG. 12 is a view illustrating a flowchart illustrating a series of processes at the time of filling ink.

FIG. 12 is a flowchart illustrating a series of processes at the time of filling ink. In step S2, the liquid ejecting apparatus 100 controls the circulation mechanism 150 in a state in which the on-off valve 160 is open, and executes a circulation operation of circulating the first ink in the order of the liquid storage portion 151, the supply flow path SF1, the individual flow path PJ, the recovery flow path CF1, and the liquid storage portion 151. In the circulation operation, the control module 120 opens the on-off valve 160, sets the in-apparatus supply flow path SJ1 to have predetermined positive pressure, sets the in-apparatus recovery flow path CJ1 to have predetermined negative pressure, and supplies the first ink to each of the plurality of head chips 14. The flow rate increases as a difference between the upstream pressure and the downstream pressure increases. Therefore, a period required for filling the nozzle N, the individual flow path PJ, the supply flow path SF1, and the recovery flow path CF1 with the first ink in accordance with an increase in the difference between the upstream pressure and the downstream pressure can be shortened.

When the circulation operation is executed when the first ink is not filled in the plurality of nozzles N, the supply flow path SF1, the individual flow path PJ, and the recovery flow path CF1, the plurality of nozzles N, the supply flow path SF1, the individual flow path PJ, and the recovery flow path CF1 are filled with the first ink, and after the first ink is filled, the first ink circulates in the order of the liquid storage portion 151, the supply flow path SF1, the individual flow path PJ, the recovery flow path CF1, and the liquid storage portion 151. By executing the circulation operation, the bubble staying in the supply flow path SF1, the individual flow path PJ, and the recovery flow path CF1 can be discharged, but the bubble may not be completely discharged and may stay. A state of the head chip 14_1 during the circulation operation will be described with reference to FIG. 13.

Figure 13:
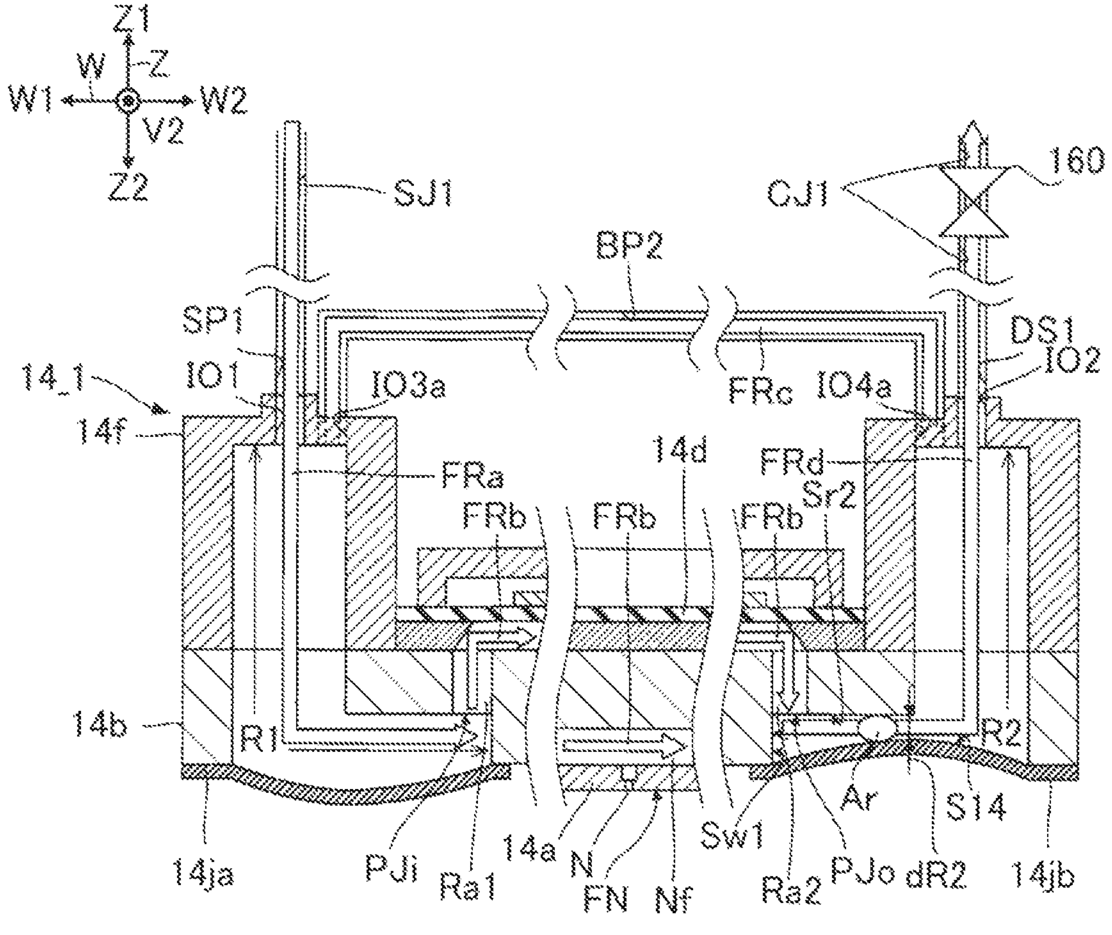
FIG. 13 is a view illustrating a state of the head chip during a circulation operation.

FIG. 13 is a view illustrating the state of the head chip 14_1 during the circulation operation. In FIG. 13 and FIG. 14, which will be described later, a view of a cross section of the head chip 14_1 which is parallel to the Z axis and the W axis and passes through the supply port IO1 and the discharge port 102 as viewed from the V2 direction to the V1 direction is illustrated. In addition, in FIGS. 13 and 14, in order to prevent the drawing from becoming complicated, the wiring substrate 14*h* and the drive circuit 14*i* are not illustrated, and the in-holder supply flow path SP1, the in-apparatus supply flow path SJ1, the bypass flow path BP2, the in-holder discharge flow path DS1, and the in-apparatus recovery flow path CJ1 are schematically illustrated. Furthermore, in FIGS. 13 and 14, in order to make it easier to understand the flow of the first ink in the bypass flow path BP2, as a display for convenience, the discharge port IO3*a* is displayed by being shifted in the W2 direction from the original, and the introduction port IO4*a* is displayed by being shifted in the W1 direction from the original. In addition, in FIGS. 13 and 14, for easy understanding, the on-off valve 160 is illustrated as a white figure in a state in which the on-off valve 160 is open, and the on-off valve 160 is illustrated as a black figure in a state in which the on-off valve 160 is closed. In FIG. 13, the on-off valve 160 is open.

As illustrated in FIG. 13, the flow FRa of the first ink in the supply flow path SF1, the flow FRb of the first ink in the individual flow path PJ, the flow FRc of the first ink in the bypass flow path BP, and the flow FRd of the first ink in the recovery flow path CF1 are formed by the circulation operation. The flow FRa is a flow of the first ink from the liquid storage portion 151 to an opening PJi of each of the plurality of individual flow paths PJ or the discharge port IO3*b* via the supply flow path SF1. The flow FRb is a flow of the first ink from the opening PJi to the opening PJo. The flow FRc is a flow of the first ink from the discharge port IO3*b* to the introduction port IO4*b* via the bypass flow path BP2. Although not illustrated in FIG. 13, a flow of the first ink from the discharge port IO3*a* to the introduction port IO4*a* via the bypass flow path BP1 is also formed by the circulation operation. The flow FRd is a flow of the first ink from an opening PJo of each of the plurality of individual flow paths PJ to the liquid storage portion 151 via the recovery flow path CF1.

Since the pressure of the first common liquid chamber R1 also becomes the positive pressure when the in-apparatus supply flow path SJ1 has the predetermined positive pressure, as illustrated in FIG. 13, the flexible member 14*ja* is bent in the Z2 direction. On the other hand, since the pressure of the second common liquid chamber R2 also becomes the negative pressure when the in-apparatus recovery flow path CJ1 has the predetermined negative pressure, as illustrated in FIG. 13, the flexible member 14*jb* is bent in the Z1 direction. As the flexible member 14*jb* is bent in the Z1 direction, the width dR2 from the wall surface of the second common liquid chamber R2 in the Z1 direction to the flexible member 14*jb* along the Z axis becomes narrower compared to a state in which the flexible member 14*jb* is not deformed. For example, in a state in which the flexible member 14*jb* is bent in the Z1 direction, the width dR2 is about 100 μm.

As the width dR2 becomes narrower, there is a concern that the bubble is likely to stay in the second common liquid chamber R2. When the bubble is generated in the second common liquid chamber R2, the ink supply amount is insufficient or an ejection abnormality occurs. The ejection abnormality is a state in which the ink cannot be ejected according to an aspect specified by the drive signal Com even though an attempt is made to eject the ink from the nozzle N by the drive signal Com. This is because since the pressure in the individual flow path PJ becomes the negative pressure when the ink is ejected from the nozzle N, when the ink is drawn from the second common liquid chamber R2, the bubble staying in the second common liquid chamber R2 is also drawn into the individual flow path PJ together with the ink in the second common liquid chamber R2, so the nozzle N is blocked by the bubble. FIG. 13 illustrates a bubble Ar staying in the second common liquid chamber R2.

The bubble has a property that the smaller the volume of the bubble, the less likely the shape of the bubble is to be deformed. Therefore, when the bubble is sandwiched between a surface Sr2 of the second common liquid chamber R2 facing the Z2 direction and the surface S14 of the flexible member 14*jb* facing the Z1 direction as the width dR2 is narrowed, it may be difficult for the bubble to pass through the second common liquid chamber R2 because the bubble is difficult to deform.

Furthermore, it can be said that the bubble is likely to stay in the second common liquid chamber R2 having a width dR2 narrower than that of the individual flow path PJ. When the bubble exists in the individual flow path PJ, the individual flow path PJ may be blocked by the bubble. When the individual flow path PJ is blocked, the pressure applied to an upstream surface of the bubble staying in the individual flow path PJ increases due to the flow FRb of the first ink in the individual flow path PJ, and a difference in pressure between an upstream portion and a downstream portion of the bubble increases, and a force for moving the bubble is generated by this difference in pressure. Therefore, even though the bubble exists in the individual flow path PJ, the bubble moves to the recovery flow path CF1 downstream due to the difference in pressure in which the bubble receives, so that the bubble is less likely to stay in the individual flow path PJ. On the other hand, even though the bubble exists in the second common liquid chamber R2 having a narrow width dR2, it can be said that the possibility that the second common liquid chamber R2 is blocked by the bubble is lower than the possibility that the individual flow path PJ is blocked. This is because, since the second common liquid chamber R2 extends along the V axis, even though the size of the bubble is substantially equal to the width of the second common liquid chamber R2 along the Z axis, the first ink flows in a portion of the second common liquid chamber R2 where the bubble Ar does not exist, that is, the portion in the V1 direction or the V2 direction with respect to the bubble Ar, so that the first ink can flow while avoiding the bubble Ar. Since the first ink collides with the bubble, a difference in pressure is generated between the upstream portion and the downstream portion of the bubble Ar, but it is difficult to generate enough force to deform the bubble Ar and pass through the width dR2. As described above, as the width dR2 is narrowed, the bubble Ar is less likely to be discharged from the second common liquid chamber R2.

In addition, in FIG. 13, the bubble Ar is displayed at a position sandwiched between the surface Sr2 and the surface S14, but a position where the bubble is likely to stay in a state in which the flexible member 14*jb* is bent in the Z1 direction is not limited to the position illustrated in FIG. 13. When the flexible member 14*jb* is not deformed, as understood from FIG. 7, an angle formed by the surface Sw1 and the surface S14 defining an end of the second common liquid chamber R2 in the W1 direction is approximately 90 degrees. However, when the flexible member 14*jb* is bent in the Z1 direction, the angle formed by the surface Sw1 and the surface S14 becomes an acute angle. Therefore, the bubble is sandwiched between the surface Sw1 and the surface S14, and the bubble is likely to stay. A similar phenomenon occurs between a surface defining an end of the second common liquid chamber R2 in the W2 direction and the surface S14.

The description returns to FIG. 12. In step S4, when a predetermined flow rate is circulated by the circulation operation, the control module 120 executes the pressurization discharge operation of discharging the first ink from each of the plurality of nozzles N by closing the on-off valve 160. In the pressurization discharge operation, the control module 120 pressurizes the first ink in the supply flow path SF1 by setting the in-apparatus supply flow path SJ1 to have the predetermined positive pressure by the control of the circulation mechanism 150. However, the pressure of the in-apparatus supply flow path SJ1 during the circulation operation and the pressure of the in-apparatus supply flow path SJ1 during the pressurization discharge operation may be the same value or different values. By closing the on-off valve 160, a place where the first ink is discharged is limited to the nozzle N only. A state of the head chip 14_1 during the pressurization discharge operation will be described with reference to FIG. 14.

Figure 14:
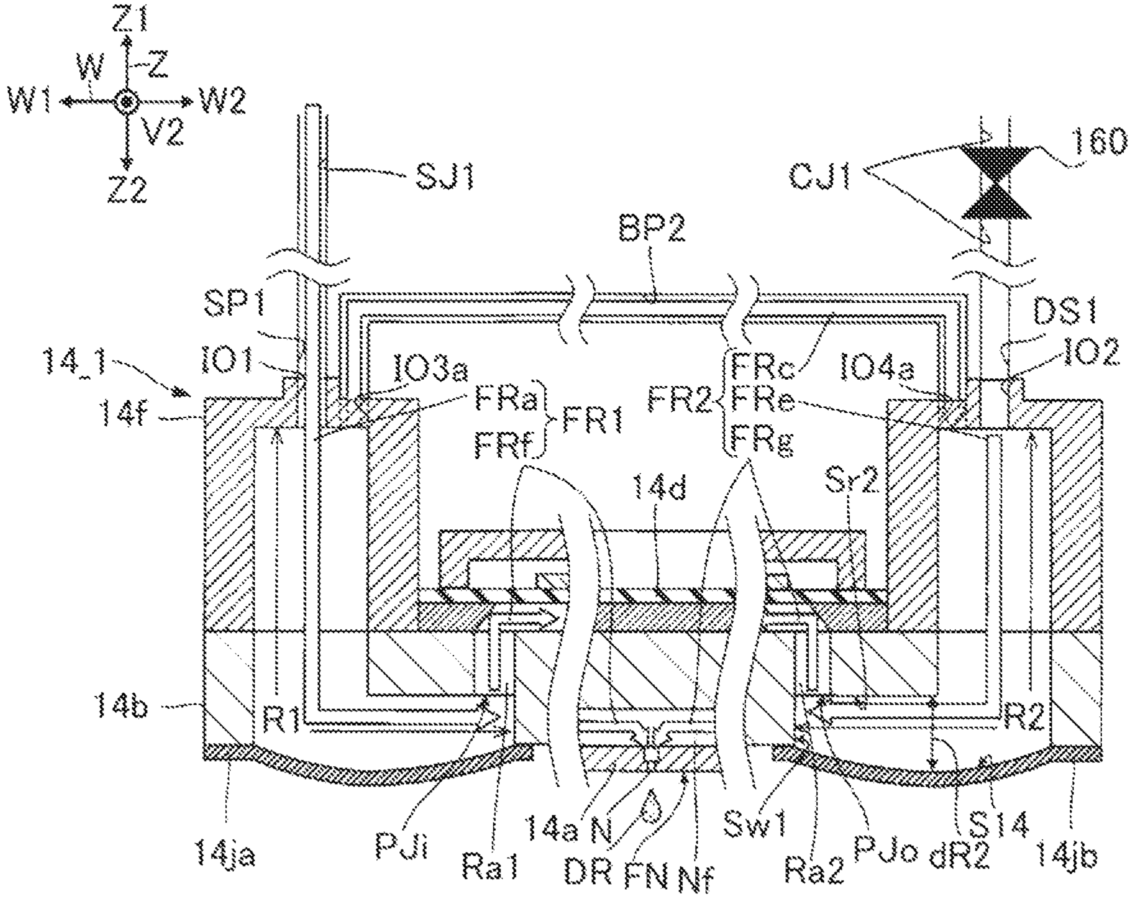
FIG. 14 is a view illustrating a state of the head chip in a pressurization discharge operation.

FIG. 14 is a view illustrating the state of the head chip 14_1 in the pressurization discharge operation. In the pressurization discharge operation, a flow toward the nozzle N is formed because the nozzle N is the only place where the first ink is discharged. Specifically, as illustrated in FIG. 14, by the pressurization discharge operation, the flow FR1 of the first ink from the supply flow path SF1 to the nozzle N via a part of the individual flow path PJ and the flow FR2 of the first ink from the supply flow path SF1 to the nozzle N via the bypass flow path BP, a part of the recovery flow path CF1, and a part of the individual flow path PJ in this order, are formed. The flow FR1 includes a flow FRa of the first ink in the supply flow path SF1 and a flow FRf of the first ink in a flow path of a part of the individual flow path PJ. The flow FR2 includes a flow FRc of the first ink in the bypass flow path BP2, a flow FRe of the first ink in the second common liquid chamber R2 which is a part of the recovery flow path CF1, and a flow FRg of the first ink in the flow path of the part of the individual flow path PJ. By closing the on-off valve 160, the recovery flow path CF1 is divided into two flow paths, an upstream flow path and a downstream flow path, with the on-off valve 160 interposed therebetween. The second common liquid chamber R2 is included in the upstream flow path of the two flow paths, that is, a flow path close to the individual flow path PJ. Similar to FIG. 13, the flow FR2 also includes a flow of the first ink in the bypass flow path BP1.

The flow FRe is a flow of the first ink from the introduction port IO4*b* to the opening PJo of each of the plurality of individual flow paths PJ through the second common liquid chamber R2. The flow FRf is a flow of the first ink from the opening PJi to the nozzle N through the flow path of the part of the individual flow path PJ. Therefore, the flow path of the part of the individual flow path PJ in the flow FRf is the individual supply flow path Ra1, the pressure chamber Ca, the first communication flow path Na1, and a flow path from an end of the nozzle flow path Nf in the W1 direction to a point where it communicates with nozzle N. The flow FRg is the flow of the first ink from the opening PJo to the nozzle N through the flow path of the part of the individual flow path PJ. Therefore, the flow path of the part of the individual flow path PJ in the flow FRg is the individual discharge flow path Ra2, the pressure chamber Cb, the second communication flow path Na2, and a flow path from an end of the nozzle flow path Nf in the W2 direction to a point where it communicates with nozzle N. The first ink is discharged from the nozzle N by the flow FRf and the flow FRg. In FIG. 14, the first ink being discharged from the nozzle N is illustrated by displaying a droplet DR.

In the pressurization discharge operation, the pressure of the second common liquid chamber R2 is likely to be a positive pressure via the bypass flow path BP. In FIG. 14, it is assumed that the pressure of the second common liquid chamber R2 is the positive pressure. When the pressure of the second common liquid chamber R2 is a positive pressure, the flexible member 14*jb* is bent in the Z2 direction as illustrated in FIG. 14. That is, since the width dR2 becomes wide, the bubble Ar is released from being sandwiched between the surface Sr2 and the surface S14. Therefore, the bubble Ar moves in the second common liquid chamber R2 along the flow FRe, moves in the flow path of the part of the individual flow path PJ along the flow FRg, and is discharged together with the droplet DR. Even when the bubble is sandwiched between the surface Sw1 and the surface S14 in the circulation operation, an angle formed by the surface Sw1 and the surface S14 becomes an obtuse angle, as understood from FIG. 14. Therefore, the bubble sandwiched between the surface Sw1 and the surface S14 also easily moves and is discharged together with the droplet DR. The bubble sandwiched between the surface S14 and the surface defining an end of the second common liquid chamber R2 in the W2 direction in the circulation operation is also discharged together with the droplet DR in the same manner as the bubble sandwiched between the surface Sw1 and the surface S14.

In addition, as understood from FIGS. 13 and 14, in the circulation operation and the pressurization discharge operation, the flows of the first ink in the second common liquid chamber R2 are opposite to each other. It may be difficult for the bubble to move in one direction, but it may be easy for the bubble to move in the opposite direction. For example, the surface Sr2 may be inclined in the Z2 direction as it is directed in the W2 direction. When the Z axis is a vertical axis, buoyancy in the Z1 direction is generated in the bubble. Therefore, in the circulation operation, the bubble in contact with the surface Sr2 needs to move against the buoyancy in order to move in the W2 direction. On the other hand, in the pressurization discharge operation, the bubble in contact with the surface Sr2 may move in the W1 direction. When the surface Sr2 is inclined in the Z2 direction as it is directed in the W2 direction, it is easier for the bubble in contact with the surface Sr2 to move in the W1 direction compared to moving in the W2 direction.

By the pressurization discharge operation, the bubble staying in any of the bypass flow paths BP1 and BP2, the second common liquid chamber R2, and the flow path from the opening PJo to the nozzle N among each of the plurality of individual flow paths PJ is discharged from the nozzle N. Therefore, it is preferable that the control module 120 ends the pressurization discharge operation after at least from the start of the pressurization discharge operation, flowing the first ink of a volume obtained by multiplying the sum of the volumes of the bypass flow paths BP1 and BP2, the second common liquid chamber R2, and the flow path from the opening PJo to the nozzle N among each of the plurality of individual flow paths PJ by the number of the liquid ejecting heads 10 included in the liquid ejecting apparatus 100, in the flow FR2. After the end of the pressurization discharge operation, the liquid ejecting apparatus 100 ends a series of processes illustrated in FIG. 12.

In the above description, the liquid ejecting apparatus 100 executes the series of processes illustrated in FIG. 12 in a state in which the plurality of nozzles N, the supply flow path SF1, the individual flow path PJ, and the recovery flow path CF1 are not filled with the first ink, but it is not limited to this. For example, the liquid ejecting apparatus 100 may execute the series of processes illustrated in FIG. 12 as one of the maintenance processes to restore the ink ejection state to normal in a state in which the plurality of nozzles N, the supply flow path SF1, the individual flow path PJ, and the recovery flow path CF1 are filled with the first ink, for example, before and/or after the printing process.

1-10. Summary of First Embodiment

Hereinafter, the features of the liquid ejecting apparatus 100 will be described using the flow path related to the first ink.

As described above, the liquid ejecting apparatus 100 according to the first embodiment includes the plurality of nozzles N that eject the first ink, the plurality of individual flow paths PJ that communicate with each of the plurality of nozzles N, and a liquid storage portion 151 that stores the first ink to be supplied to each of the plurality of nozzles N, the supply flow path SF1 for supplying the first ink from the liquid storage portion 151 to the plurality of individual flow paths PJ, the recovery flow path CF1 for recovering the first ink from the plurality of individual flow paths PJ to the liquid storage portion 151, the bypass flow path BP that couples the supply flow path SF1 and the recovery flow path CF1 without passing through any of the plurality of individual flow paths PJ, and the on-off valve 160 that can close and open the recovery flow path CF1. The on-off valve 160 is disposed between the bypass flow path BP and the liquid storage portion 151 in the recovery flow path CF1, and the liquid ejecting apparatus 100 executes the pressurization discharge operation of discharging the first ink from each of the plurality of nozzles N by pressurizing the first ink in the supply flow path SF1 in a state in which the recovery flow path CF1 is closed by the on-off valve 160.

By pressurizing the first ink in a state in which the recovery flow path CF1 is closed by the on-off valve 160, a flow FR2 of the first ink flowing toward the nozzle N via the bypass flow paths BP1 and BP2 is formed because the nozzle N is the only place where the first ink is discharged. In the second common liquid chamber R2 which is a part of the recovery flow path CF1, the direction of the flow FRe of the first ink formed by the pressurization discharge operation is opposite to the direction of the flow FRd of the first ink formed by the circulation operation. Therefore, the liquid ejecting apparatus 100 according to the first embodiment can discharge the bubble in the recovery flow path CF1 that cannot be discharged in the circulation operation. That is, the liquid ejecting apparatus 100 according to the first embodiment can easily discharge the bubble staying in the recovery flow path CF1.

In addition, as an aspect for generating a flow in the recovery flow path CF1 in a direction opposite to the direction of the flow FRd, an aspect in which the on-off valve 160 is not provided, the first ink is supplied from the recovery flow path CF1, and the first ink is recovered from the supply flow path SF1 is also conceivable. Hereinafter, this aspect will be referred to as a “comparative aspect”. However, in the comparative aspect, since the ink that does not pass through the filter 25 is supplied to the individual flow path PJ, there is a possibility that the ejection abnormality due to the foreign matter may occur. In the first embodiment, the bypass flow path BP is provided downstream of the filter 25. Therefore, in the liquid ejecting apparatus 100 according to the first embodiment, the first ink from which the foreign matter is removed by the filter 25 can form the flow FR2 flowing toward the nozzle N via the bypass flow path BP. As described above, the liquid ejecting apparatus 100 according to the first embodiment can suppress the occurrence of the ejection abnormality due to the foreign matter as compared with the comparative aspect, while suppressing the occurrence of the ejection abnormality due to the bubble.

In addition, the liquid ejecting apparatus 100 according to the first embodiment further includes the flexible member **14*jb* that defines a portion of the recovery flow path CF1 coupled to the bypass flow path BP, and has flexibility. The portion of the recovery flow path CF1 coupled to the bypass flow path BP is the second common liquid chamber R2**.

As described above, the flexible member **14*jb* is bent in the Z1 direction, so that bubble is likely to stay in the second common liquid chamber R2. In the liquid ejecting apparatus 100 according to the first embodiment, since the flexible member 14*jb* can be bent in the Z2 direction in the pressurization discharge operation, the bubble staying in the second common liquid chamber R2** can be discharged.

In addition, instead of the flexible member **14*jb*, an aspect having a member having no flexibility is also conceivable. However, in this aspect, since the pressure fluctuation of the second common liquid chamber R2 easily reaches the pressure chamber C, the ejection abnormality is likely to occur. Therefore, the liquid ejecting apparatus 100 according to the first embodiment can suppress the occurrence of the ejection abnormality due to the bubble while improving the quality of the image formed on the medium M by having the flexible member 14*jb***.

In addition, during the execution of the pressurization discharge operation, the pressure of the first ink flowing upstream from the on-off valve 160 in the recovery flow path CF1 is the positive pressure with respect to the atmospheric pressure. The first ink flowing upstream of the on-off valve 160 in the recovery flow path CF1 means the first ink flowing upstream of the on-off valve 160 in the circulation operation, and typically, is the first ink in the second common liquid chamber R2. In other words, it can be said that the first ink in the second common liquid chamber R2 flows a downstream portion of the bypass flow path BP in the recovery flow path CF1 in the pressurization discharge operation, as illustrated by the flow FR2 in FIG. 14.

When the pressure of the first ink is the positive pressure, in the liquid ejecting apparatus 100 according to the first embodiment, the flexible member 14*jb* can be bent in the Z2 direction during the pressurization discharge operation.

In addition, by the pressurization discharge operation, the flow FR1 of the first ink from the supply flow path SF1 to the nozzle N via a part of the individual flow path PJ and the flow FR2 of the first ink from the supply flow path SF1 to the nozzle N via the bypass flow path BP, the second common liquid chamber R2, which is a part of the recovery flow path CF1, and a part of the individual flow path PJ in this order, are formed.

By forming the flow FR2, the liquid ejecting apparatus 100 according to the first embodiment can generate a flow in the second common liquid chamber R2 in the direction opposite to the direction of the flow FRd.

In addition, the liquid ejecting apparatus 100 according to the first embodiment executes the circulation operation of circulating the first ink in the order of the liquid storage portion 151, the supply flow path SF1, the individual flow path PJ, the recovery flow path CF1, and the liquid storage portion 151.

In addition, the liquid ejecting apparatus 100 according to the first embodiment starts the pressurization discharge operation by closing the recovery flow path CF1 by the on-off valve 160 while the circulation operation is being executed.

By closing the on-off valve 160 while the circulation operation is being executed, it is possible to instantaneously generate pressure for the first ink in the recovery flow path CF1 toward the nozzle N. Therefore, in the liquid ejecting apparatus 100 according to the first embodiment, a period required for discharging the bubble can be shortened as compared with an aspect in which the on-off valve 160 is closed after the circulation operation is temporarily stopped by the circulation mechanism 150, and the first ink in the supply flow path SF1 is pressurized by the circulation mechanism 150 after the on-off valve 160 is closed. Since the period required for discharging the bubble is shortened, in the liquid ejecting apparatus 100 according to the first embodiment, the amount of the ink discharged from the nozzle N during the pressurization discharge operation can be reduced because the period required for the pressurization discharge operation is shortened.

In addition, the liquid ejecting apparatus 100 according to the first embodiment includes a compressor 152 that pressurizes the ink in the supply flow path SF1 so as to flow the ink in the supply flow path SF1 only in a direction in which the first ink flows from the liquid storage portion 151 to the plurality of individual flow paths PJ via the supply flow path SF1 by the circulation operation.

In the liquid ejecting apparatus 100 according to the first embodiment, since it is not necessary to change the flow direction of the first ink in the recovery flow path CF1 to the opposite direction by the compressor 152, the configuration of the liquid ejecting apparatus 100 can be simplified as compared with an aspect in which the flow direction of the first ink in the recovery flow path CF1 can be changed in the opposite direction by the compressor 152. In addition, in the above-described comparative aspect, the flow directions are changed in the opposite directions in the supply flow path SF1, the individual flow path PJ, the bypass flow path BP, and the recovery flow path CF1. On the other hand, in the liquid ejecting apparatus 100 according to the first embodiment, the flow direction is changed only in the second common liquid chamber R2 and a part of the individual flow path PJ. Therefore, in the liquid ejecting apparatus 100 according to the first embodiment, as compared with the comparative aspect, a range of changing the flow direction among the supply flow path SF1, the individual flow path PJ, the bypass flow path BP, and the recovery flow path CF1 can be narrowed, so that the period required for discharging the bubble can be shortened.

In addition, the supply flow path SF1 has the first common liquid chamber R1 coupled to the plurality of individual flow paths PJ, the recovery flow path CF1 has a second common liquid chamber R2 coupled to the plurality of individual flow paths PJ. The bypass flow path BP causes the first common liquid chamber R1 to communicate with the second common liquid chamber R2. In other words, the bypass flow path BP is coupled to the second common liquid chamber R2 in the recovery flow path CF1.

In the liquid ejecting apparatus 100 according to the first embodiment, a range of changing the flow direction in the recovery flow path CF1 can be narrowed as compared with an aspect in which the bypass flow path BP is coupled to any of the in-holder discharge flow path DS1 and the in-structure discharge flow path CM1 other than the second common liquid chamber R2 in the recovery flow path CF1. In the liquid ejecting apparatus 100 according to the first embodiment, by shortening a range of changing the flow direction in the recovery flow path CF1, a period required for discharging the bubble can be shortened, and an ink consumption amount can also be reduced. That is, it is preferable that a flow path length from a coupling position between the bypass flow path BP and the recovery flow path CF1 to the on-off valve 160 is shorter than a flow path length from the coupling position to the opening PJo which is one end of the individual flow path PJ.

The flow path resistance of the bypass flow path BP is smaller than the sum of flow path resistances of the plurality of individual flow paths PJ.

In the liquid ejecting apparatus 100 according to the first embodiment, the pressure of the second common liquid chamber R2 can be easily set to the positive pressure as compared with an aspect in which the flow path resistance of the bypass flow path BP is larger than the sum of flow path resistances of the plurality of individual flow paths PJ.

According to the above description, the liquid ejecting apparatus 100 according to the first embodiment can also be specified as a liquid discharging method for executing the pressurization discharge operation of discharging the first ink from each of the plurality of nozzles N by pressurizing the first ink in the supply flow path SF1 in a state in which the recovery flow path CF1 is closed by the on-off valve 160.

2. MODIFICATION EXAMPLE

Each form exemplified above can be variously modified. Specific modification aspects are exemplified below. Two or more aspects optionally selected from the following examples can be appropriately combined within a scope where the aspects do not contradict each other.

2.1. First Modification Example

The liquid storage portion 151 according to the first embodiment includes the first sub tank 1512 that stores ink to be supplied to each of the plurality of liquid ejecting heads 10, and the second sub tank 1516 that recovers the ink from each of the plurality of liquid ejecting heads 10, but the present disclosure is not limited to this. Specifically, the sub tank that stores the ink to be supplied to each of the plurality of liquid ejecting heads 10 and the sub tank that recovers the ink from each of the plurality of liquid ejecting heads 10 may be the same.

Figure 15:
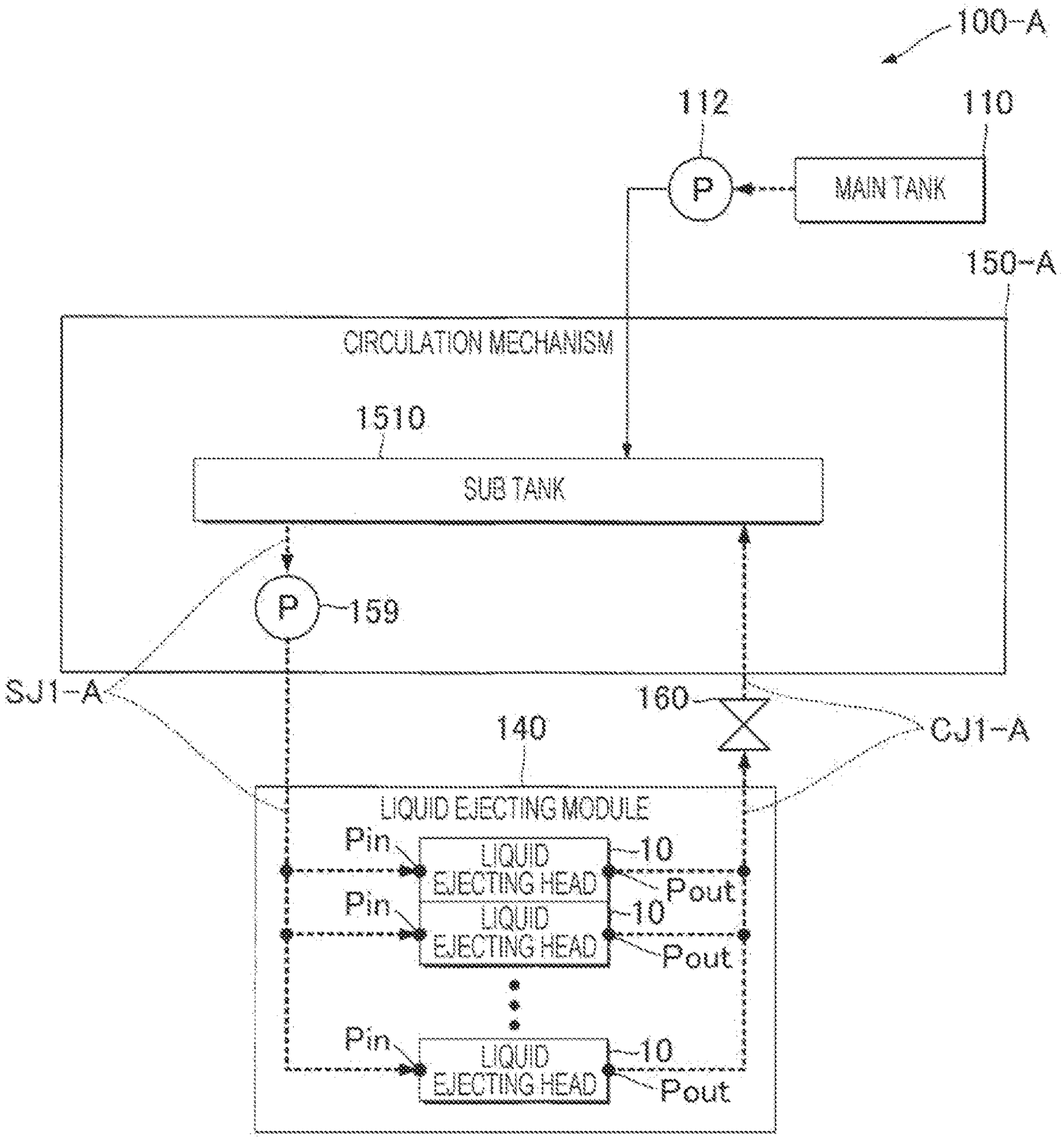
FIG. 15 is a view illustrating a circulation mechanism in a first modification example.

FIG. 15 is a view illustrating a circulation mechanism 150-A in a first modification example. A liquid ejecting apparatus 100-A according to the first modification example differs from the liquid ejecting apparatus 100 in that it has a circulation mechanism 150-A instead of the circulation mechanism 150, an in-apparatus supply flow path SJ1-A instead of the in-apparatus supply flow path SJ1, and an in-apparatus recovery flow path CJ1-A instead of the in-apparatus recovery flow path CJ1.

The circulation mechanism 150-A differs from the circulation mechanism 150 in that it has a sub tank 1510 instead of the liquid storage portion 151, does not have the compressor 152, the regulator 153, the vacuum pump 154, the regulator 155, the pressure sensor 156, and the pressure sensor 157, and uses the pump 159. In the first modification example, the sub tank 1510 is an example of the "liquid storage portion", and the pump 159 is an example of the "pressurizing mechanism".

The sub tank 1510 stores the first ink to be supplied to each of the plurality of liquid ejecting heads 10. In the sub tank 1510, the first ink replenished from the main tank 110 and the first ink recovered from each of the plurality of liquid ejecting heads 10 are stored.

The in-apparatus supply flow path SJ1-A differs from the in-apparatus supply flow path SJ1 in that a pump 159 is provided instead of the pressure sensor 156. The pump 159 pressurizes the first ink in the in-apparatus supply flow path SJ1-A. The in-apparatus recovery flow path CJ1-A differs from the in-apparatus recovery flow path CJ1 in that it does not have the pressure sensor 157.

2-2. Second Modification Example

In the first embodiment and the first modification example, the on-off valve 160 is provided outside the liquid ejecting head 10, but may be provided inside the liquid ejecting head 10.

Figure 16:
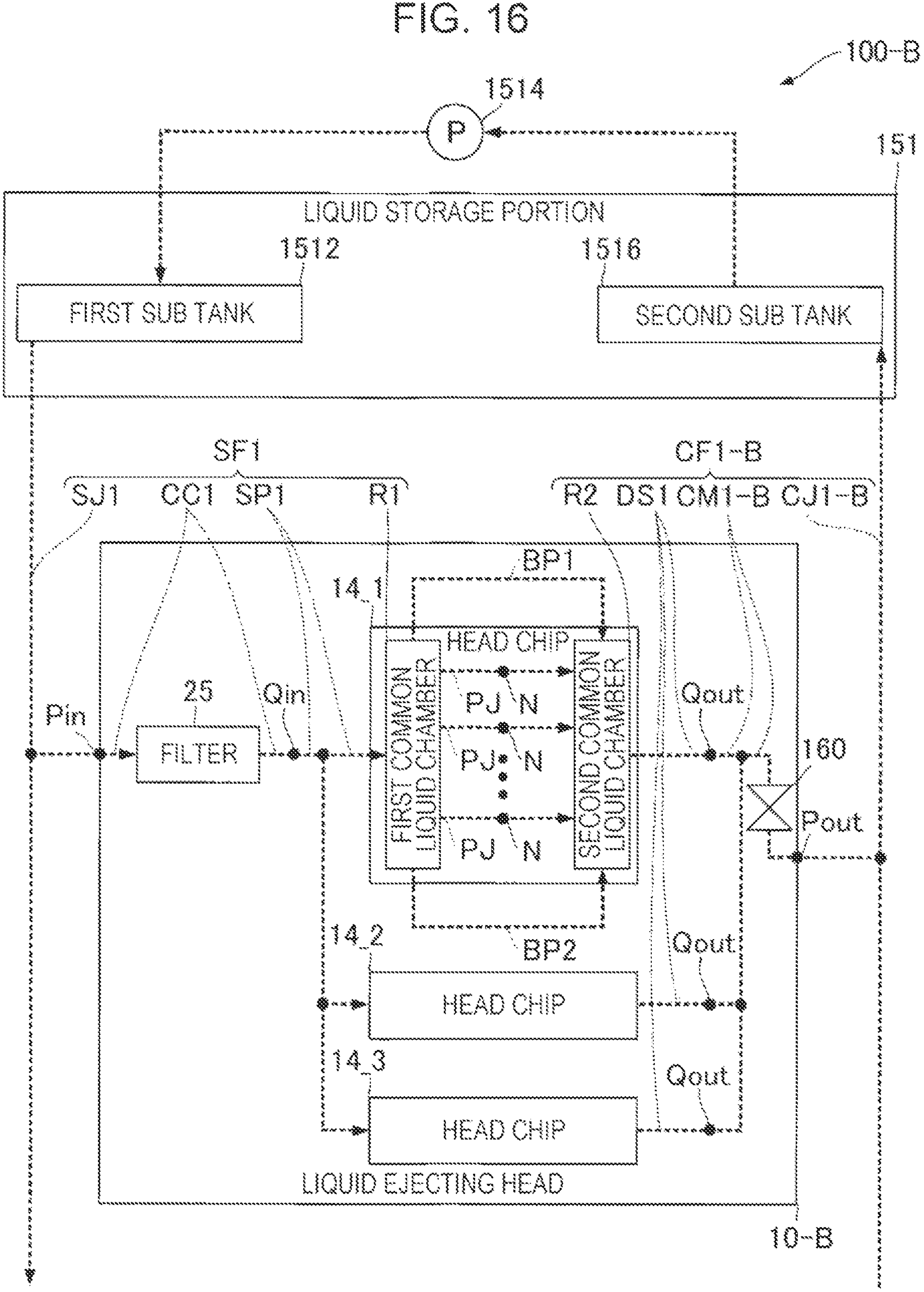
FIG. 16 is a schematic view illustrating a flow path in a liquid ejecting apparatus in a second modification example.

FIG. 16 is a schematic view illustrating a flow path in a liquid ejecting apparatus 100-B in a second modification example. FIG. 16 illustrates the flow path through which the first ink flows. In the second modification example, since the flow path through which the second ink flows is the same as the flow path through which the first ink flows, the description thereof will be omitted.

The liquid ejecting apparatus 100-B differs from the liquid ejecting apparatus 100 in that it has a recovery flow path CF1-B instead of the recovery flow path CF1. The recovery flow path CF1-B differs from the recovery flow path CF1 in that it has an in-structure discharge flow path CM1-B instead of the in-structure discharge flow path CM1, and has an in-apparatus recovery flow path CJ1-B instead of the in-apparatus recovery flow path CJ1. The in-structure discharge flow path CM1-B is provided in the liquid ejecting head 10-B in the second modification example. Therefore, the liquid ejecting head 10-B differs from the liquid ejecting head 10 in that the in-structure discharge flow path CM1-B is provided instead of the in-structure discharge flow path CM1.

The in-structure discharge flow path CM1-B differs from the in-structure discharge flow path CM1 in that an on-off valve 160 is provided. In the second modification example, the on-off valve 160 is provided for each of the liquid ejecting heads 10-B.

The in-apparatus recovery flow path CJ1-B differs from the in-apparatus recovery flow path CJ1 in that the on-off valve 160 is not provided.

As understood from the first embodiment and the second modification example, since the flow of the ink is reversed via the bypass flow path BP in the pressurization discharge operation, the on-off valve 160 may be located downstream of the bypass flow path BP in the circulation operation. One on-off valve 160 may be provided in the liquid ejecting apparatus 100 as in the first embodiment, may be provided for each of the liquid ejecting heads 10-B as illustrated in FIG. 16, or may be provided for each head chip 14. As an example in which the on-off valve 160 is provided for each head chip 14, in FIG. 16, the on-off valve 160 is provided in the in-structure discharge flow path CM1-B, but the on-off valve 160 may be provided in each of the three in-holder discharge flow paths DS1.

2-3. Third Modification Example

In the first embodiment, the first modification example, and the second modification example, the bypass flow path BP is provided inside the liquid ejecting head 10, 10-B, 10-C, but as it is located upstream of the on-off valve 160, the bypass flow path BP may be provided outside the liquid ejecting head 10, 10-B, 10-C.

Figure 17:
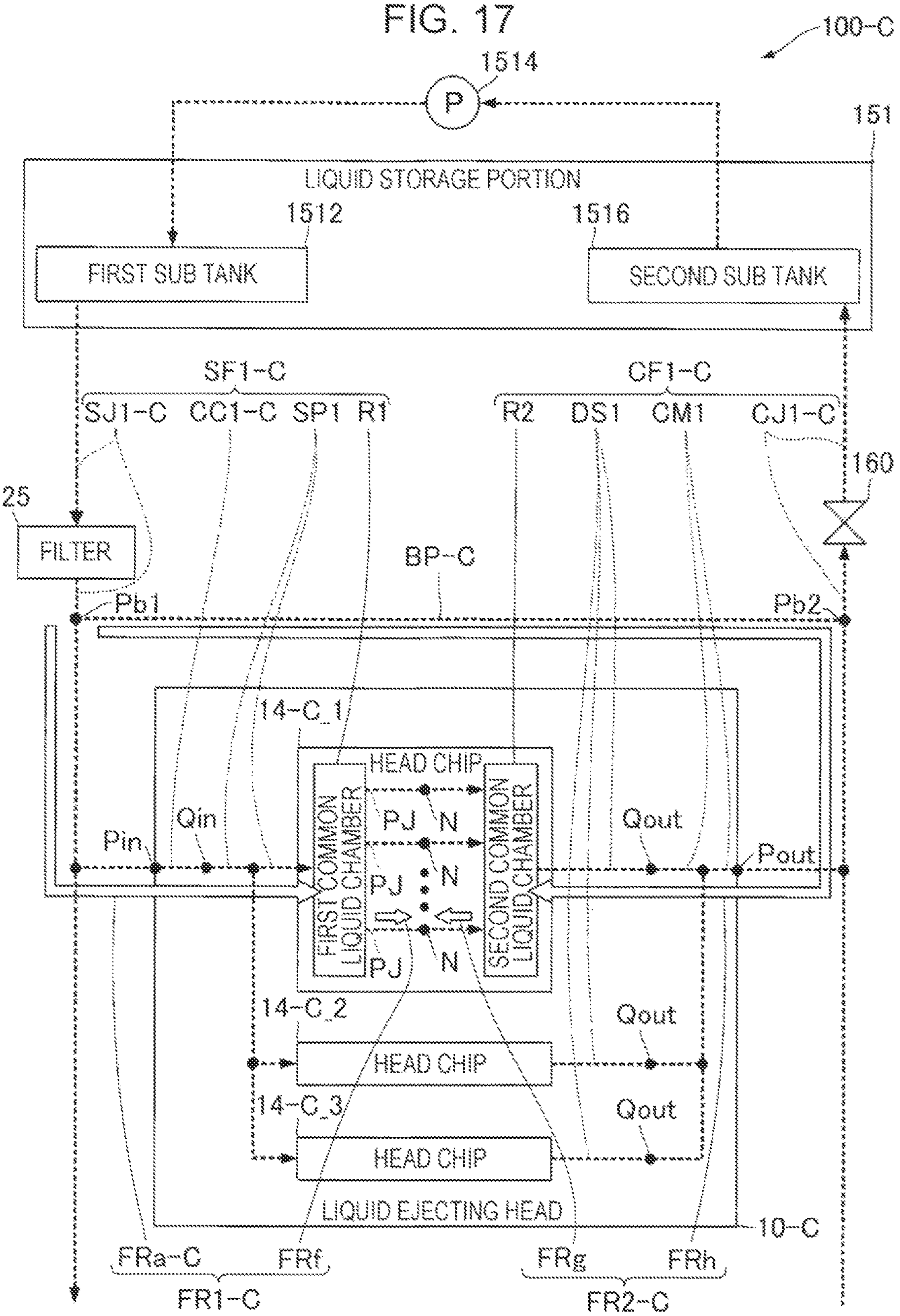
FIG. 17 is a schematic view illustrating a flow path in a liquid ejecting apparatus in a third modification example.

FIG. 17 is a schematic view illustrating a flow path in a liquid ejecting apparatus 100-C in a third modification example. FIG. 17 illustrates the flow path through which the first ink flows. In the third modification example, since the flow path through which the second ink flows is the same as the flow path through which the first ink flows, the description thereof will be omitted.

The liquid ejecting apparatus 100-C differs from the liquid ejecting apparatus 100 in that it has a supply flow path SF1-C instead of the supply flow path SF1 and has a recovery flow path CF1-C instead of the recovery flow path CF1.

The supply flow path SF1-C differs from the supply flow path SF1 in that it has an in-apparatus supply flow path SJ1-C instead of the in-apparatus supply flow path SJ1 and has an in-structure supply flow path CC1-C instead of the in-structure supply flow path CC1. The recovery flow path CF1-C differs from the recovery flow path CF1 in that the in-apparatus recovery flow path CJ1-C is provided instead of the in-apparatus recovery flow path CJ1. The in-structure supply flow path CC1-C is provided in the liquid ejecting head 10-C in the third modification example. Therefore, the liquid ejecting head 10-C differs from the liquid ejecting head 10 in that the in-structure supply flow path CC1-C is provided instead of the in-structure supply flow path CC1. Furthermore, the liquid ejecting head 10-C differs from the liquid ejecting head 10 in that it has a plurality of head chips 14-C instead of the plurality of head chips 14.

The in-apparatus supply flow path SJ1-C differs from the in-apparatus supply flow path SJ1 in that a filter is provided and is further coupled by a bypass flow path BP-C. The in-apparatus recovery flow path CJ1-C differs from the in-apparatus recovery flow path CJ1 in that it is coupled by the bypass flow path BP-C. The in-structure supply flow path CC1-C differs from the in-structure supply flow path CC1 in that the filter 25 is not provided.

As illustrated in FIG. 17, a first coupling position Pb1 between the bypass flow path BP-C and the in-apparatus supply flow path SJ1-C is located upstream of the first common liquid chamber R1. Furthermore, the first coupling position Pb1 is located downstream of the filter 25.

As illustrated in FIG. 17, a second coupling position Pb2 between the bypass flow path BP-C and the in-apparatus recovery flow path CJ1-C is located downstream of the second common liquid chamber R2. Furthermore, the second coupling position Pb2 is located upstream of the on-off valve 160.

The flow path resistance from the second coupling position Pb2 to the nozzle N is smaller than the flow path resistance from the first coupling position Pb1 to the nozzle N. In the following, for the easy description, the flow path resistance from the first coupling position Pb1 to the nozzle N may be described as "first flow path resistance", and the flow path resistance from the second coupling position Pb2 to the nozzle N may be described as "second flow path resistance".

FIG. 17 illustrates a flow FR1-C and a flow FR2-C formed by the pressurization discharge operation when the on-off valve 160 is closed. The flow FR1-C is a flow of the first ink from the supply flow path SF1-C to the nozzle N via a part of the individual flow path PJ. The flow FR2-C is a flow of the first ink from the first coupling position Pb1 of the supply flow path SF1-C to the nozzle N via the bypass flow path BP-C, a part of the recovery flow path CF1-C, and a part of the individual flow path PJ in this order.

The flow FR1-C has a flow FRa-C and a flow FRf. The flow FRa-C is a flow of the first ink reaching the first common liquid chamber R1 via the flow path from the first coupling position Pb1 in the in-apparatus supply flow path SJ1-C to the liquid supply port Pin of the liquid ejecting head 10-C, the in-structure supply flow path CC1-C, and the in-holder supply flow path SP1 in this order. The flow FRf is the same as in the first embodiment.

The flow FR2-C has a flow FRh and a flow FRg. The flow FRh is a flow of the first ink reaching the second common liquid chamber R2 via the bypass flow path BP-C, a flow path from the second coupling position Pb2 in the in-apparatus recovery flow path CJ1-C to the liquid discharge port Pout of the liquid ejecting head 10-C, the in-structure discharge flow path CM1, and the in-holder discharge flow path DS1 in this order. The flow FRg is the same as in the first embodiment.

In the pressurization discharge operation, as indicated by the flow FR2-C, the second coupling position Pb2 is located upstream of the second common liquid chamber R2.

As understood from FIG. 17, the flexible member 14*jb* in the third modification example defines the second common liquid chamber R2 which is a part of the recovery flow path CF1-C located upstream of the second coupling position Pb2 between the bypass flow path BP-C and the recovery flow path CF1-C.

As understood from the first embodiment and the third modification example, in order to prevent the ink not passing through the filter 25 from being supplied to the individual flow path PJ, the filter 25 may be located upstream of the bypass flow path BP, BP-C in the circulation operation. As illustrated in FIG. 17, one filter 25 may be provided in the liquid ejecting apparatus 100, may be provided for each of the liquid ejecting heads 10 as in the first embodiment, or may be provided for each head chip 14. However, the liquid ejecting apparatus 100-C may not have the filter 25. Similarly, one bypass flow path BP may be provided in the liquid ejecting apparatus 100-C as illustrated in FIG. 17, may be provided for each of the liquid ejecting heads 10-C as in the first embodiment, or may be provided for each head chip 14.

As described above, in the liquid ejecting apparatus 100-C according to the third modification example, the supply flow path SF1-C has the first common liquid chamber R1 coupled to the plurality of individual flow paths PJ, the recovery flow path CF1-C has the second common liquid chamber R2 coupled to the plurality of individual flow paths PJ, the first coupling position Pb1 between the bypass flow path BP-C and the supply flow path SF1-C is located upstream of the first common liquid chamber R1, the second coupling position Pb2 between the bypass flow path BP-C and the recovery flow path CF1-C is located downstream of the second common liquid chamber R2, and the second flow path resistance from the second coupling position Pb2 to the nozzle N is smaller than the first flow path resistance from the first coupling position Pb1 to the nozzle N.

The nozzle N discharges the first ink that flows according to the flow FR1-C and the first ink that flows according to the flow FR2-C. In the pressurization discharge operation, since the bubble contained in the flow FR2-C is discharged, the amount of the first ink discharged by the flow FR2-C is preferably larger than the amount of the ink discharged by the flow FR1-C. Since the second flow path resistance is smaller than the first flow path resistance, the ink discharged by the flow FR2-C is larger than the ink discharged by the flow FR1-C as compared with the aspect in which the second flow path resistance is larger than the first flow path resistance. As described above, in the liquid ejecting apparatus 100-C according to the third modification example, the bubble contained in the flow FR2-C can be easily discharged as compared with the aspect in which the second flow path resistance is larger than the first flow path resistance.

2-4. Fourth Modification Example

The second common liquid chamber R2 of the head chip 14 in each of the above-described aspects is partitioned by the flexible member 14*jb* having flexibility, but may be partitioned by a member having no flexibility. As described above, it may be difficult for the bubble to move in one direction, but it may be easy for the bubble to move in the opposite direction. The liquid ejecting apparatus 100 according to the fourth modification example can discharge the bubble, which is difficult to be discharged in the circulation operation, by the pressurization discharge operation.

2-5. Fifth Modification Example

In each of the above-described aspects, the pressurization discharge operation is started by closing the recovery flow path CF1 by the on-off valve 160 during execution of the circulation operation, but the on-off valve 160 may be closed after the circulation operation by the circulation mechanism 150 is temporarily stopped, and then the first ink in the supply flow path SF1 may be pressurized by the circulation mechanism 150.

2-6. Sixth Modification Example

In each of the above-described aspects, the flow path resistance of the bypass flow path BP is smaller than the sum of the flow path resistances of the plurality of individual flow paths PJ, but the flow path resistance of the bypass flow path BP may be larger than the sum of the flow path resistances of the plurality of individual flow paths PJ.

2-7. Seventh Modification Example

In each of the above-described aspects, the two pressure chambers C communicate with one nozzle N, but the present disclosure is not limited thereto. For example, the number of pressure chambers C communicating with one nozzle N may be one or three or more, for example, four.

2-8. Eighth Modification Example

As illustrated in FIG. 1, the liquid ejecting apparatus 100 in each of the above-described aspects is a so-called line type liquid ejecting apparatus in which the plurality of liquid ejecting heads 10 are fixed to the support body 41 and printing is performed simply by transporting the medium M, but the configuration of the liquid ejecting apparatus is not limited to that described above. For example, the present disclosure can also be applied to a so-called serial type liquid ejecting apparatus in which the plurality of liquid ejecting heads 10 are mounted on a carriage, the plurality of the liquid ejecting heads 10 are reciprocated along the X axis direction, and printing is performed by transporting the medium M.

2-9. Other Modification Examples

The above-described liquid ejecting apparatus can be adopted in various apparatuses such as a facsimile machine and a copier, in addition to an apparatus dedicated to printing. However, the application of the liquid ejecting apparatus of the present disclosure is not limited to printing. For example, the liquid ejecting apparatus that ejects a solution of a coloring material is used as a manufacturing apparatus for forming a color filter of a liquid crystal display device. In addition, a liquid ejecting apparatus that ejects a solution of a conductive material is used as a manufacturing apparatus for forming wiring and electrodes of a wiring substrate.

3. APPENDIX

From the above-exemplified embodiment, for example, the following configuration can be grasped.

A liquid ejecting apparatus according to Aspect 1, which is a preferred aspect, includes: a plurality of nozzles that eject liquid; a plurality of individual flow paths that communicate with each of the plurality of nozzles; a liquid storage portion that stores the liquid to be supplied to each of the plurality of nozzles; a supply flow path for supplying the liquid from the liquid storage portion to the plurality of individual flow paths; a recovery flow path for recovering the liquid from the plurality of individual flow paths to the liquid storage portion; a bypass flow path that couples the supply flow path and the recovery flow path without passing through any of the plurality of individual flow paths; and an on-off valve configured to close and open the recovery flow path, in which the on-off valve is disposed between the bypass flow path and the liquid storage portion in the recovery flow path, and a pressurization discharge operation of discharging the liquid from each of the plurality of nozzles by pressurizing the liquid in the supply flow path in a state in which the recovery flow path is closed by the on-off valve is executed.

By pressurizing the liquid in a state in which the recovery flow path is closed by the on-off valve, a flow of the liquid flowing toward the nozzle via the bypass flow path and a part of the recovery flow path is formed because the nozzle is the only place where the liquid is discharged. In the part of the recovery flow path, the direction of the flow of the liquid formed by the pressurization discharge operation is opposite to the direction of the flow of the liquid formed in a state in which the recovery flow path is opened by the on-off valve. Therefore, according to the Aspect 1, the bubble in the recovery flow path that cannot be discharged in the state the recovery flow path is opened by the on-off valve can be discharged. That is, according to the Aspect 1, the bubble staying in the recovery flow path can be easily discharged.

In Aspect 2 which is a specific example of the Aspect 1, the liquid ejecting apparatus further includes a flexible member that defines a part of the recovery flow path upstream from a coupling position between the bypass flow path and the recovery flow path or a portion of the recovery flow path coupled to the bypass flow path and that has flexibility.

In the Aspect 2, the flexible member is bent in a direction of narrowing a width of a flow path of the part of the recovery flow path, so that the bubble is likely to stay in the recovery flow path. In the Aspect 2, since the flexible member can be bent in the direction of widening the width of the flow path of the part of the recovery flow path in the pressurization discharge operation, the bubble staying in the recovery flow path can be discharged.

In Aspect 3 which is a specific example of the Aspect 2, during the execution of the pressurization discharge operation, pressure of the liquid flowing upstream of the on-off valve in the recovery flow path is positive pressure with respect to atmospheric pressure.

According to the Aspect 3, since the pressure of the liquid is the positive pressure, the flexible member can be bent in a direction of widening the width of the flow path of the part of the recovery flow path during the pressurization discharge operation.

In Aspect 4 which is a specific example of the Aspect 1, a flow of the liquid from the supply flow path to the nozzle via a part of the individual flow path and a flow of the liquid from the supply flow path to the nozzle via the bypass flow path, a part of the recovery flow path, and a part of the individual flow path in this order are formed by the pressurization discharge operation.

According to the Aspect 4, the flow of the liquid from the supply flow path to the nozzle via the bypass flow path, the part of the recovery flow path, and the part of the individual flow path in this order is formed, so that it is possible to generate a flow in a direction opposite to a direction from the recovery flow path to the liquid storage portion in the part of the recovery flow path.

In Aspect 5 which is a specific example of the Aspect 1, a circulation operation of circulating the liquid in an order of the liquid storage portion, the supply flow path, the individual flow path, the recovery flow path, and the liquid storage portion is executed.

In Aspect 6 which is a specific example of the Aspect 5, during the execution of the circulation operation, the pressurization discharge operation is started by closing the recovery flow path by the on-off valve.

By closing the recovery circuit with the on-off valve while the circulation operation is being executed, it is possible to instantaneously generate the pressure for the liquid in the recovery flow path toward the nozzle. Therefore, according to the Aspect 6, a period required for discharging the bubble can be shortened as compared with an aspect in which the recovery flow path is closed by the on-off valve after the circulation operation is temporarily stopped, and the liquid in the supply flow path is pressurized after the recovery flow path is closed.

In Aspect 7 which is a specific example of the Aspect 5, the liquid ejecting apparatus further includes a pressurizing mechanism that pressurizes the liquid in the supply flow path such that the liquid in the supply flow path flows only in a direction in which the liquid flows from the liquid storage portion to the plurality of individual flow paths via the supply flow path by the circulation operation.

According to the Aspect 7, since it is not necessary to change the direction of the liquid flow in the recovery flow path to the opposite direction by the pressurizing mechanism, the configuration of the liquid ejecting apparatus can be simplified as compared with an aspect in which the direction of the liquid flow in the recovery flow path can be changed in the opposite direction by the pressurizing mechanism.

In Aspect 8 which is a specific example of the Aspect 1, the supply flow path has a first common liquid chamber coupled to the plurality of individual flow paths, the recovery flow path has a second common liquid chamber coupled to the plurality of individual flow paths, and the bypass flow path causes the first common liquid chamber to communicate with the second common liquid chamber.

In the liquid ejecting apparatus according to the Aspect 8, as compared with an aspect in which the bypass flow path is coupled to the flow path other than the second common liquid chamber in the recovery flow path, a range of changing the flow direction in the recovery flow path can be shortened. Therefore, according to the Aspect 8, by shortening the range of changing the flow direction in the recovery flow path, the period required for discharging the bubble can be shortened, and a liquid consumption amount can also be reduced.

In Aspect 9 which is a specific example of the Aspect 1, a flow path resistance of the bypass flow path is smaller than a sum of flow path resistances of the plurality of individual flow paths.

According to the Aspect 9, pressure of the second common liquid chamber can be easily set to positive pressure as compared with an aspect in which the flow path resistance of the bypass flow path is larger than the sum of the flow path resistances of the plurality of individual flow paths.

In Aspect 10 which is a specific example of the Aspect 1, the supply flow path has a first common liquid chamber coupled to the plurality of individual flow paths, the recovery flow path has a second common liquid chamber coupled to the plurality of individual flow paths, a first coupling position between the bypass flow path and the supply flow path is located upstream of the first common liquid chamber, a second coupling position between the bypass flow path and the recovery flow path is located downstream of the second common liquid chamber, and a flow path resistance from the second coupling position to the nozzle is smaller than a flow path resistance from the first coupling position to the nozzle.

According to the Aspect 10, the bubble included in the recovery flow path is easily discharged as compared with an aspect in which the flow path resistance from the second coupling position to the nozzle is larger than the flow path resistance from the first coupling position to the nozzle.

A liquid discharging method of a liquid ejecting apparatus according to Aspect 11, which is another preferred aspect, is a liquid discharging method of a liquid ejecting apparatus including a plurality of nozzles that eject liquid, a plurality of individual flow paths that communicate with each of the plurality of nozzles, a liquid storage portion that stores the liquid to be supplied to each of the plurality of nozzles, a supply flow path for supplying the liquid from the liquid storage portion to the plurality of individual flow paths, a recovery flow path for recovering the liquid from the plurality of individual flow paths to the liquid storage portion, a bypass flow path that couples the supply flow path and the recovery flow path without passing through any of the plurality of individual flow paths, and an on-off valve configured to close and open the recovery flow path, the method includes disposing the on-off valve between the bypass flow path and the liquid storage portion in the recovery flow path, and executing a pressurization discharge operation of discharging the liquid from each of the plurality of nozzles by pressurizing the liquid in the supply flow path in a state in which the recovery flow path is closed by the on-off valve, by the liquid ejecting apparatus.

According to the Aspect 11, the same effect as that of the Aspect 1 can be obtained.

In Aspect 12 which is a specific example of the Aspect 11, the liquid ejecting apparatus further includes a flexible member that defines a part of the recovery flow path upstream from a coupling position between the bypass flow path and the recovery flow path or a portion of the recovery flow path coupled to the bypass flow path and that has flexibility.

According to the Aspect 12, the same effect as that of the Aspect 2 can be obtained.

In Aspect 13 which is a specific example of the Aspect 11, during the execution of the pressurization discharge operation, pressure of the liquid flowing upstream of the on-off valve in the recovery flow path is positive pressure with respect to atmospheric pressure.

According to the Aspect 13, the same effect as that of the Aspect 3 can be obtained.

In Aspect 14 which is a specific example of the Aspect 11, a flow of the liquid from the supply flow path to the nozzle via a part of the individual flow path and a flow of the liquid from the supply flow path to the nozzle via the bypass flow path, a part of the recovery flow path, and a part of the individual flow path in this order are formed by the pressurization discharge operation.

According to the Aspect 14, the same effect as that of the Aspect 4 can be obtained.

In Aspect 15 which is a specific example of the Aspect 11, the liquid ejecting apparatus executes a circulation operation of circulating the liquid in an order of the liquid storage portion, the supply flow path, the individual flow path, the recovery flow path, and the liquid storage portion.

According to the Aspect 15, the same effect as that of the Aspect 5 can be obtained.

In Aspect 16 which is a specific example of the Aspect 15, the liquid ejecting apparatus starts the pressurization discharge operation by closing the recovery flow path by the on-off valve during the execution of the circulation operation.

According to the Aspect 16, the same effect as that of the Aspect 6 can be obtained.

In Aspect 17 which is a specific example of the Aspect 15, the liquid ejecting apparatus further includes a pressurizing mechanism that pressurizes the liquid in the supply flow path such that the liquid in the supply flow path flows only in a direction in which the liquid flows from the liquid storage portion to the plurality of individual flow paths via the supply flow path by the circulation operation.

According to the Aspect 17, the same effect as that of the Aspect 7 can be obtained.

In Aspect 18 which is a specific example of the Aspect 11, the supply flow path has a first common liquid chamber coupled to the plurality of individual flow paths, the recovery flow path has a second common liquid chamber coupled to the plurality of individual flow paths, and the bypass flow path causes the first common liquid chamber to communicate with the second common liquid chamber.

According to the Aspect 18, the same effect as that of the Aspect 8 can be obtained.

In Aspect 19 which is a specific example of the Aspect 11, a flow path resistance of the bypass flow path is smaller than a sum of flow path resistances of the plurality of individual flow paths.

According to the Aspect 19, the same effect as that of the Aspect 9 can be obtained.

In Aspect 20 which is a specific example of the Aspect 11, the supply flow path has a first common liquid chamber coupled to the plurality of individual flow paths, the recovery flow path has a second common liquid chamber coupled to the plurality of individual flow paths, a first coupling position between the bypass flow path and the supply flow path is located upstream of the first common liquid chamber, a second coupling position between the bypass flow path and the recovery flow path is located downstream of the second common liquid chamber, and a flow path resistance from the second coupling position to the nozzle is smaller than a flow path resistance from the first coupling position to the nozzle.

According to the Aspect 20, the same effect as that of the Aspect 10 can be obtained.

What is claimed is:

1. A liquid ejecting apparatus comprising:
- nozzles configured to eject liquid;
- individual flow paths communicating with each of the nozzles;
- a liquid storage portion storing the liquid to be supplied to each of the nozzles;
- a supply flow path for supplying the liquid from the liquid storage portion to the individual flow paths;
- a recovery flow path for recovering the liquid from the individual flow paths to the liquid storage portion;
- a bypass flow path that couples the supply flow path and the recovery flow path without passing through any of the individual flow paths; and
- an on-off valve configured to close and open the recovery flow path, wherein
- the on-off valve is disposed between the bypass flow path and the liquid storage portion in the recovery flow path, and
- a pressurization discharge operation of discharging the liquid from each of the nozzles by pressurizing the liquid in the supply flow path in a state in which the recovery flow path is closed by the on-off valve is executed.

2. The liquid ejecting apparatus according to claim 1, further comprising:
- a flexible member that defines a part of the recovery flow path upstream from a coupling position between the bypass flow path and the recovery flow path or a portion of the recovery flow path coupled to the bypass flow path and that has flexibility.

3. The liquid ejecting apparatus according to claim 2, wherein
- during the execution of the pressurization discharge operation, pressure of the liquid flowing upstream of the on-off valve in the recovery flow path is positive pressure with respect to atmospheric pressure.

4. The liquid ejecting apparatus according to claim 1, wherein
- a flow of the liquid from the supply flow path to the nozzle via a part of the individual flow path and a flow of the liquid from the supply flow path to the nozzle via the bypass flow path, a part of the recovery flow path, and a part of the individual flow path in this order are formed by the pressurization discharge operation.

5. The liquid ejecting apparatus according to claim 1, wherein
- a circulation operation of circulating the liquid in an order of the liquid storage portion, the supply flow path, the individual flow path, the recovery flow path, and the liquid storage portion is executed.

6. The liquid ejecting apparatus according to claim 5, wherein
- during the execution of the circulation operation, the pressurization discharge operation is started by closing the recovery flow path by the on-off valve.

7. The liquid ejecting apparatus according to claim 5, further comprising:
- a pressurizing mechanism that pressurizes the liquid in the supply flow path such that the liquid in the supply flow path flows only in a direction in which the liquid flows from the liquid storage portion to the individual flow paths via the supply flow path by the circulation operation.

8. The liquid ejecting apparatus according to claim 1, wherein
- the supply flow path has a first common liquid chamber coupled to the individual flow paths,
- the recovery flow path has a second common liquid chamber coupled to the individual flow paths, and
- the bypass flow path makes the first common liquid chamber communicate with the second common liquid chamber.

9. The liquid ejecting apparatus according to claim 1, wherein
- a flow path resistance of the bypass flow path is smaller than a sum of flow path resistances of the individual flow paths.

10. The liquid ejecting apparatus according to claim 1, wherein
- the supply flow path has a first common liquid chamber coupled to the individual flow paths,
- the recovery flow path has a second common liquid chamber coupled to the individual flow paths,
- a first coupling position between the bypass flow path and the supply flow path is located upstream of the first common liquid chamber,
- a second coupling position between the bypass flow path and the recovery flow path is located downstream of the second common liquid chamber, and
- a flow path resistance from the second coupling position to the nozzle is smaller than a flow path resistance from the first coupling position to the nozzle.

11. A liquid discharging method of a liquid ejecting apparatus including
- nozzles configured to eject liquid,
- individual flow paths communicating with each of the nozzles,
- a liquid storage portion storing the liquid to be supplied to each of the nozzles,
- a supply flow path for supplying the liquid from the liquid storage portion to the individual flow paths,
- a recovery flow path for recovering the liquid from the individual flow paths to the liquid storage portion,
- a bypass flow path that couples the supply flow path and the recovery flow path without passing through any of the individual flow paths, and
- an on-off valve configured to close and open the recovery flow path, the method comprising:
- disposing the on-off valve between the bypass flow path and the liquid storage portion in the recovery flow path; and executing a pressurization discharge operation of discharging the liquid from each of the nozzles by pressurizing the liquid in the supply flow path in a state in which the recovery flow path is closed by the on-off valve, by the liquid ejecting apparatus.

12. The liquid discharging method according to claim 11, wherein the liquid ejecting apparatus further includes a flexible member that defines a part of the recovery flow path upstream from a coupling position between the bypass flow path and the recovery flow path or a portion of the recovery flow path coupled to the bypass flow path and that has flexibility.

13. The liquid discharging method according to claim 12, wherein during the execution of the pressurization discharge operation, pressure of the liquid flowing upstream of the on-off valve in the recovery flow path is positive pressure with respect to atmospheric pressure.

14. The liquid discharging method according to claim 11, wherein a flow of the liquid from the supply flow path to the nozzle via a part of the individual flow path and a flow of the liquid from the supply flow path to the nozzle via the bypass flow path, a part of the recovery flow path, and a part of the individual flow path in this order are formed by the pressurization discharge operation.

15. The liquid discharging method according to claim 11, wherein the liquid ejecting apparatus executes a circulation operation of circulating the liquid in an order of the liquid storage portion, the supply flow path, the individual flow path, the recovery flow path, and the liquid storage portion.

16. The liquid discharging method according to claim 15, wherein the liquid ejecting apparatus starts the pressurization discharge operation by closing the recovery flow path by the on-off valve during the execution of the circulation operation.

17. The liquid discharging method according to claim 15, wherein the liquid ejecting apparatus includes a pressurizing mechanism that pressurizes the liquid in the supply flow path such that the liquid in the supply flow path flows only in a direction in which the liquid flows from the liquid storage portion to the individual flow paths via the supply flow path by the circulation operation.

18. The liquid discharging method according to claim 11, wherein the supply flow path has a first common liquid chamber coupled to the individual flow paths, the recovery flow path has a second common liquid chamber coupled to the individual flow paths, and the bypass flow path makes the first common liquid chamber communicate with the second common liquid chamber.

19. The liquid discharging method according to claim 11, wherein a flow path resistance of the bypass flow path is smaller than a sum of flow path resistances of the individual flow paths.

20. The liquid discharging method according to claim 11, wherein the supply flow path has a first common liquid chamber coupled to the individual flow paths, the recovery flow path has a second common liquid chamber coupled to the individual flow paths, a first coupling position between the bypass flow path and the supply flow path is located upstream of the first common liquid chamber, a second coupling position between the bypass flow path and the recovery flow path is located downstream of the second common liquid chamber, and a flow path resistance from the second coupling position to the nozzle is smaller than a flow path resistance from the first coupling position to the nozzle.

* * * * *